United States Patent
Nakamura et al.

(10) Patent No.: US 7,310,081 B2
(45) Date of Patent: Dec. 18, 2007

(54) INPUTTING DEVICE STIMULATING TACTILE SENSE OF OPERATOR THEREOF

(75) Inventors: Akio Nakamura, Shinagawa (JP);
Yuriko Nishiyama, Shinagawa (JP);
Shinichiro Akieda, Shinagawa (JP);
Shigemi Kurashima, Shinagawa (JP);
Nobuyoshi Shimizu, Shinagawa (JP);
Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 732 days.

(21) Appl. No.: 10/815,666

(22) Filed: Apr. 2, 2004

(65) Prior Publication Data

US 2004/0252104 A1 Dec. 16, 2004

(30) Foreign Application Priority Data

Jun. 10, 2003 (JP) ............................. 2003-165357

(51) Int. Cl.
*G09G 5/00* (2006.01)

(52) U.S. Cl. ...................................................... 345/156

(58) Field of Classification Search ................ 345/156, 345/160, 163, 173; 178/18.01, 18.03; 200/510
See application file for complete search history.

(56) References Cited

U.S. PATENT DOCUMENTS

| | | | |
|---|---|---|---|
| 6,373,465 B2 * | 4/2002 | Jolly et al. ................... | 345/156 |
| 6,646,632 B2 * | 11/2003 | Wegmuller et al. ......... | 345/163 |
| 6,839,050 B2 * | 1/2005 | Sakamaki et al. .......... | 345/156 |
| 7,106,313 B2 * | 9/2006 | Schena et al. .............. | 345/184 |
| 7,202,851 B2 * | 4/2007 | Cunningham et al. ...... | 345/156 |

FOREIGN PATENT DOCUMENTS

| | | |
|---|---|---|
| EP | 0 265 011 A1 | 4/1988 |
| JP | 6-202801 | 7/1994 |
| JP | 10-055250 | 2/1998 |

* cited by examiner

*Primary Examiner*—Richard Hjerpe
*Assistant Examiner*—Abbas Abdulselam
(74) *Attorney, Agent, or Firm*—Staas & Halsey LLP

(57) ABSTRACT

In an inputting apparatus which is manipulated with a finger placed on a manipulating section included in the inputting apparatus, the manipulating section is configured to stimulate the tactile sense of the finger used in the manipulating, enabling to confirm the inputting.

11 Claims, 66 Drawing Sheets

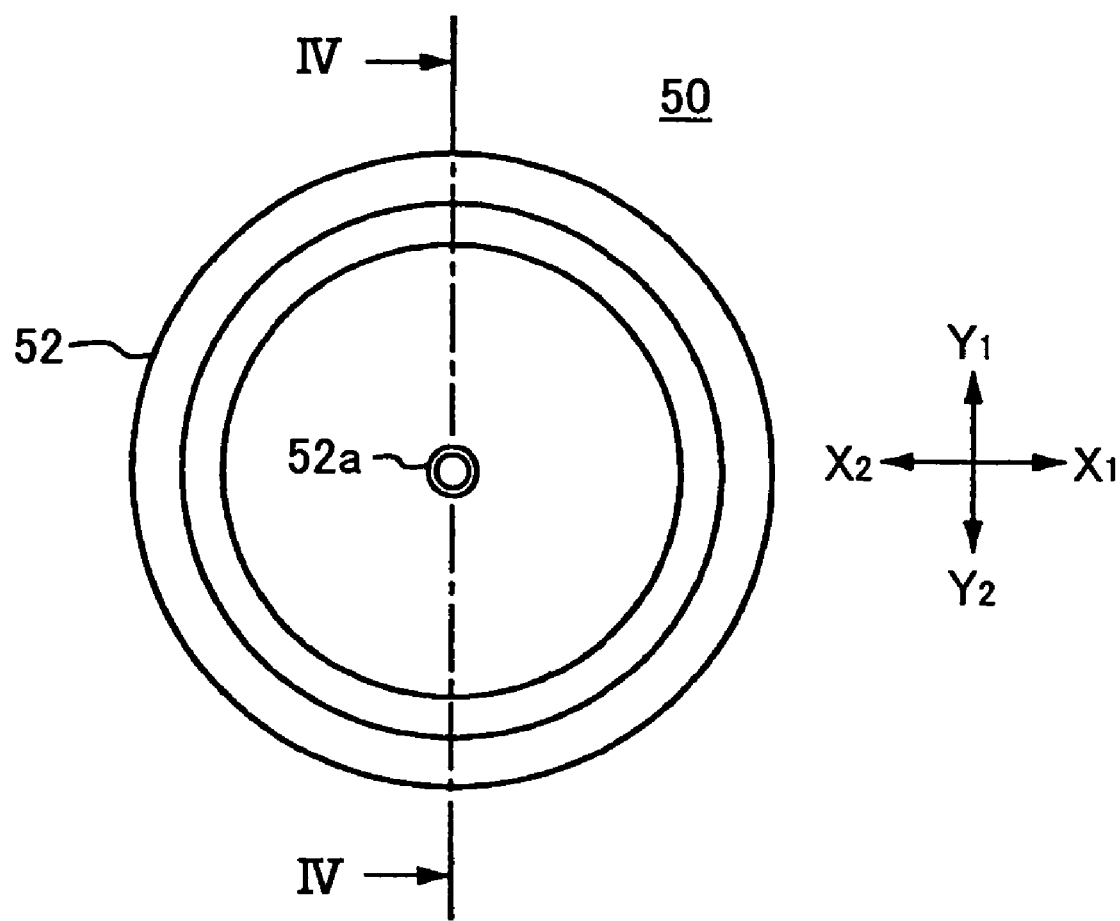

56E

B-B

INPUTTING DEVICE STIMULATING TACTILE SENSE OF OPERATOR THEREOF

BACKGROUND OF THE INVENTION

1. Field of the Invention

The present invention generally relates to an inputting device, and particularly relates to an inputting device which stimulates the tactile sense of an operator thereof.

2. Description of the Related Art

Improvements in the ability to confirm an inputting process of an inputting device are in demand.

In FIG. 1, an inputting device 10 according to the related art is illustrated. This inputting device 10 is configured to have a permanent magnet piece 12 fixed to a tilt-enabled keytop 11 and fixed on a printed circuit board 20 having mounted thereon multiple Hall elements 21 and 22. A magnetic field, which the permanent magnet piece 12 forms, acts on the multiple Hall elements 21 and 22. This inputting device 10 is incorporated together with an operation-execute button and the like into a remote control unit 30. This remote control unit 30 is used for providing a command to computer equipment.

When an operator operates with a fingertip 1 the keytop 11 so as to cause a tilt, the position of the permanent magnet piece 12 relative to the respective Hall element 21 and 22 changes, and the condition of the magnetic field acting on the respective Hall element 21 and 22 changes so that the output of the respective Hall element 21 and 22 changes. A signal is output in accordance with the change in the output of the respective Hall element 21 and 22, and a pointer on a display screen of a computer is moved in the direction of having operated the keytop 11. At a state in which the pointer points to a predetermined area, when pushing the operation-execute button, information of the area at which the pointer points in the display is input into the computer.

In the related art, a rhythmical sound is generated when the pointer moves from one area to another on the display screen, the objective being to report as a feedback to the operator the fact that the pointer has moved to another area. This provides a stimulus to the auditory sense of an operator, thereby giving the operator the ability to confirm the operation.

Patent Document 1
JP10-055250A

However, there is a problem in that, after the operation is executed for a long time so that the operator begins to show signs of fatigue, the stimulating of the auditory sense of the operator may begin to weaken so that the ability to confirm the operation may be decreased. Also, there is a problem in that, in a case of the operator having a hearing impairment, such related art method as described above can not be used.

SUMMARY OF THE INVENTION

It is a general object of the present invention to provide an inputting device that substantially obviates one or more problems caused by the limitations and disadvantages of the related art.

In view of the above points, it is a more particular object of the present invention to provide an inputting device enabled to confirm the inputting process by stimulating the tactile sense of the operator.

According to the invention, an inputting apparatus includes a manipulating section upon which a finger may be placed to manipulate the inputting apparatus, wherein the manipulating section is configured to tactile-stimulate the finger in place on the manipulating section upon occurrence of a predetermined condition.

The inputting apparatus in an embodiment of the invention enables to stimulate the tactile sense of the portion of the finger of the operator to which attention is concentrated.

According to another aspect of the invention, an inputting apparatus for use with a pointer on a display screen includes a tilt-enabled manipulating section upon which a finger may be placed to manipulate the inputting apparatus, a signal-producing section configured to produce a signal in response to a tilt of the manipulating section, which signal causes the pointer on the display screen to be moved, wherein the manipulating section includes a tactile-stimulating device configured to tactile-stimulate the finger when the pointer is in a predetermined position on the display screen.

The inputting apparatus in an embodiment of the invention enables to stimulate the tactile sense of the portion of the finger of the operator to which attention is concentrated, thereby enabling an improving of the ability to confirm the inputting process by feeding back to the operator of the fact that the inputting process was performed so as to cause the operator to recognize the fact.

BRIEF DESCRIPTION OF THE DRAWINGS

FIG. 3A is a diagram of the inputting device according to one embodiment of the present invention;

DETAILED DESCRIPTION OF THE PREFERRED EMBODIMENTS

Figure 1:
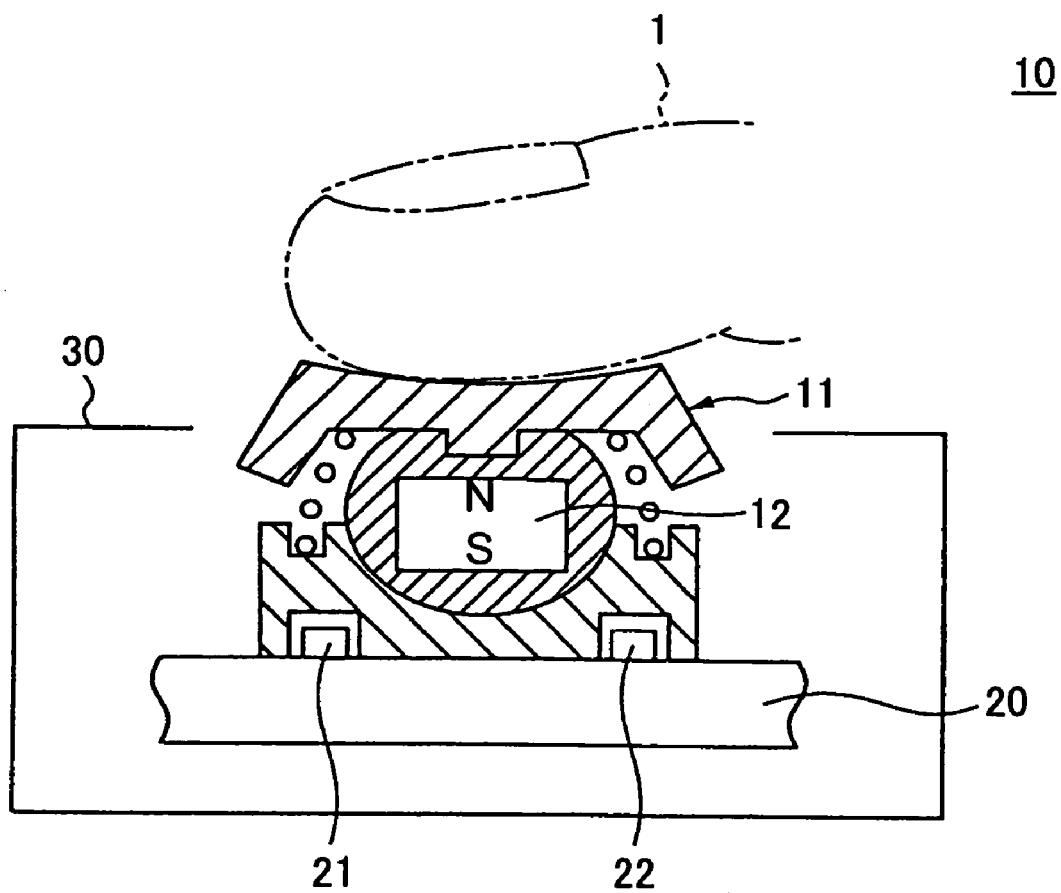
FIG. 1 is a diagram of an example according to the related art.
Figure 2:
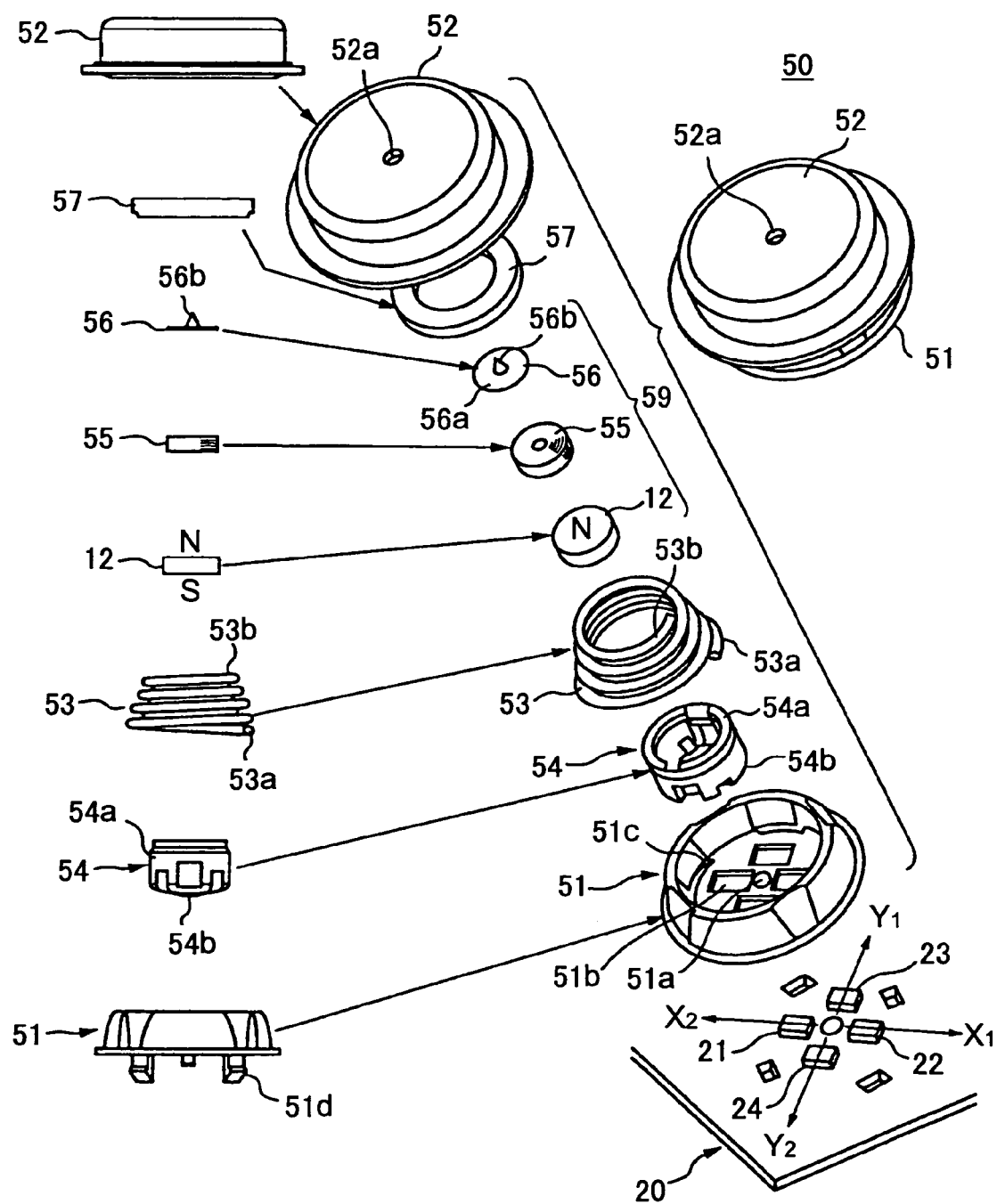
FIG. 2 is a perspective diagram of an inputting device according to one embodiment of the present invention.
Figure 3B:
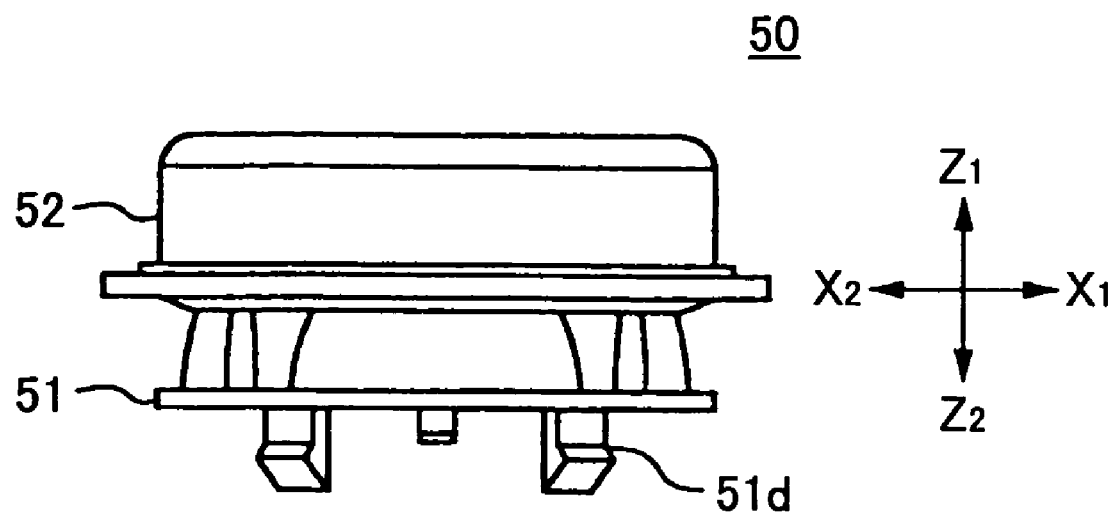
FIG. 3B is another diagram of the inputting device according to one embodiment of the present invention.
Figure 3C:
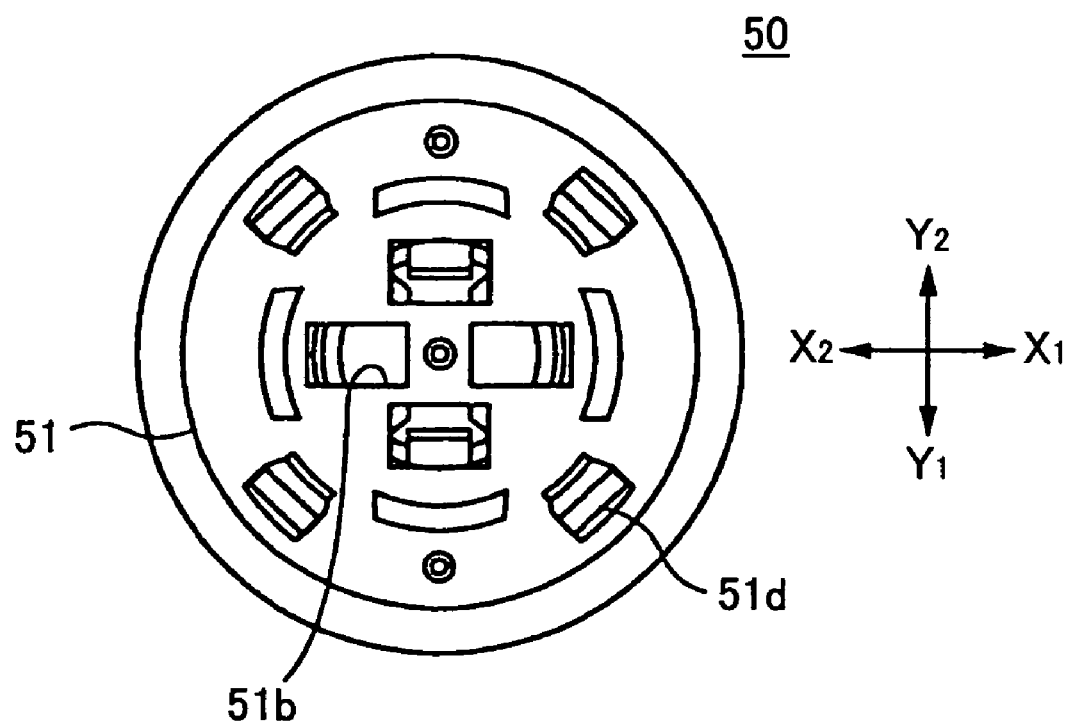
FIG. 3C is yet another diagram of the inputting device according to one embodiment of the present invention.

In the following, embodiments of the present invention are described with reference to the accompanying drawings.

FIG. 2, FIG. 3A through 3C, and FIG. 4 illustrate an inputting device 50 which constitutes a first embodiment of the present invention. Lines X1-X2 and Y1-Y2 represent the directions on the horizontal plane while Z1-Z2 represents the vertical direction. The inputting device 50 is structured to have a tactile-stimulating device 59 which constitutes a material part of the present invention and which includes a permanent magnet 12, and is configured to be mounted on a printed circuit board 20. The printed circuit board has mounted thereon 90-angle spacing Hall elements 21 through 24 as four magneto-electric converting elements.

The inputting device 50 is arranged to have a housing 51 on the bottom side, and a keytop 52 as an operating section at the top section. The inputting device 50 further includes a coil spring 53 and a holder 54 disposed between the housing 51 and the keytop 52. Incorporated within the holder 54 are the permanent magnet 12, and a moveable drive coil 55 with a projecting member 56. The permanent magnet 12 is configured in a signal-producing section for producing a signal in accordance with a movement of the keytop 52. This inputting device 50, or so-called pointing device, is used in a manner such as to place a fingertip on the keytop 52, to move the fingertip in an arbitrary X-Y direction, and thereby to cause a tilt of the keytop 52 in a random direction, so as to output coordinate information and to cause the pointer to move across a display screen.

The housing 51 has at the center of a bottom-plate section thereof a convex section. Four opening sections 51b are formed around this convex section. The coil spring 53 has a conic shape and includes a turn section 53a at its bottom edge. The turn section 53a is seized at a projection-seizing section 51c of the housing 51 so as to be fixed to the inner part of the housing 51.

The holder 54 has the shape of a cylinder with a bottom plate, and includes a cylindrical section 54a and a bottom-plate section 54b. The permanent magnet 12 has a cylindrical shape, wherein the top side is the N pole and the bottom side is the S pole. The permanent magnet 12 is fixed to the bottom portion of the inner part of the cylindrical section 54a of the holder 54. The projecting member 56 includes a circular-plate section 56a and a conic-shaped projecting section 56b at the center thereof, and is fixed to the top face of the moveable drive coil 55. The moveable drive coil 55 has a cylindrical shape and air cores, and is fitted within the cylindrical section 54a of the holder 54. The moveable drive coil 55 is disposed on the permanent magnet 12, and is enabled to move in the direction of Z1. Electric wires at the ends of the moveable drive coil 55 are pulled out of the holder 54 (not shown).

The holder 54 is disposed at the inner part of the coil spring 53. The holder 54 has a concave section 54c at the center of the bottom face of the bottom-plate section 54b. The concave section 54c is fitted to a corresponding convex section 51a. The holder 54 is held in a state in which an outer-peripheral portion on the top side of the cylindrical section 54a thereof is seized to a turn section 53b (FIG. 2) at the upper end of the coil spring 53.

The keytop 52, via a spacer 57 held to its back face, is held with respect to the top portion of the cylindrical section 54a of the holder 54, and blocks the opening at the upper end of the holder 54. A hole 52a is formed at the center of the keytop 52. A conic-shaped projecting section 56b of the projecting member 56 is projectable outwards from the hole 52a.

The keytop 52, while having to bend the coil spring 53, with the convex section 51a at the center, is able to be tilted together with the holder 54. When the keytop 52 is operated and causes a tilt, for example in the Y2 direction, the permanent magnet 12 is tilted in a manner as represented by an arrow 79 in FIG. 5.

The moveable drive coil 55 and the projecting member 56 form a tactile-stimulating element 58. This tactile-stimulating element 58 and the permanent magnet 12 form the tactile-stimulating device 59.

Herein, the tactile-stimulating device 59, configured to use the permanent magnet 12 which is provided originally for outputting a signal in accordance with an operation of the keytop 52, enables a relatively smaller size configuration owing to the smaller number of components used. Accordingly, the tactile-stimulating device 59 may be incorporated within a narrow space on the bottom side of the keytop 52. Therefore, the inputting device 50, notwithstanding that it includes the tactile-stimulating device 59, has the height dimension H being kept to the height dimension of the inputting device according to the related art.

The inputting device 50, having a configuration as described above, is mounted on the printed circuit board 20 using a hook 51d on the bottom side of the housing 51, and has the respective Hall elements 21 through 24 being fitted into the corresponding opening sections 51b.

Figure 5:
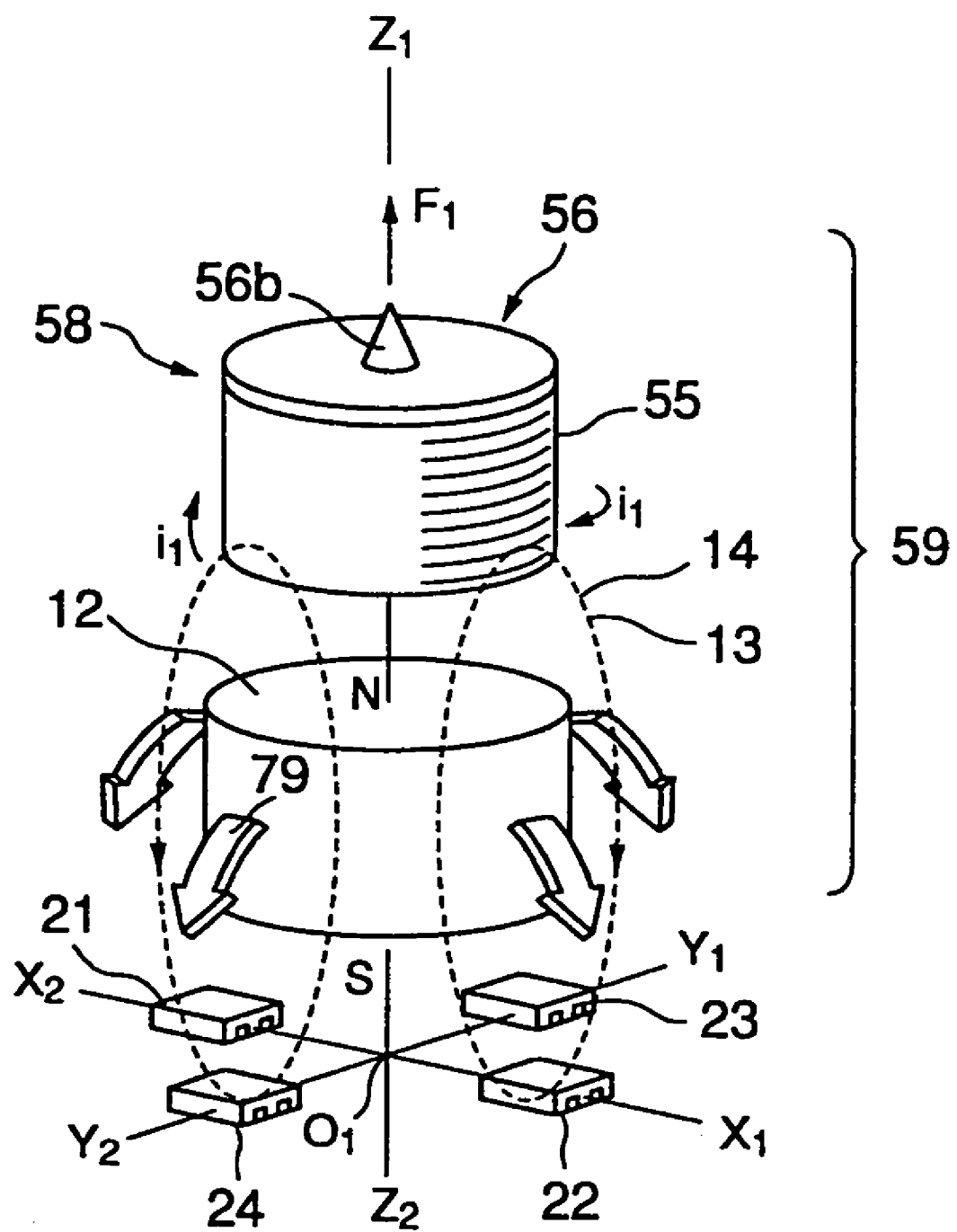
FIG. 5 is a diagram of a positional relationship in the inputting device between Hall elements and a moveable drive coil relative to a permanent magnet.

As illustrated in FIG. 5, on the bottom side of the permanent magnet 12, the Hall elements 21 through 24 are arranged at a position to which a magnetic field 13 formed by the permanent magnet 12 extends. On the top side of the permanent magnet 12, the moveable drive coil 55 is arranged at a position to which the magnetic field 13 formed by the permanent magnet 12 extends. The magnetic lines of force 14 forming the magnetic field 13 acting on the moveable drive coil 55 are substantially perpendicular to the X-Y plane.

Figure 4:
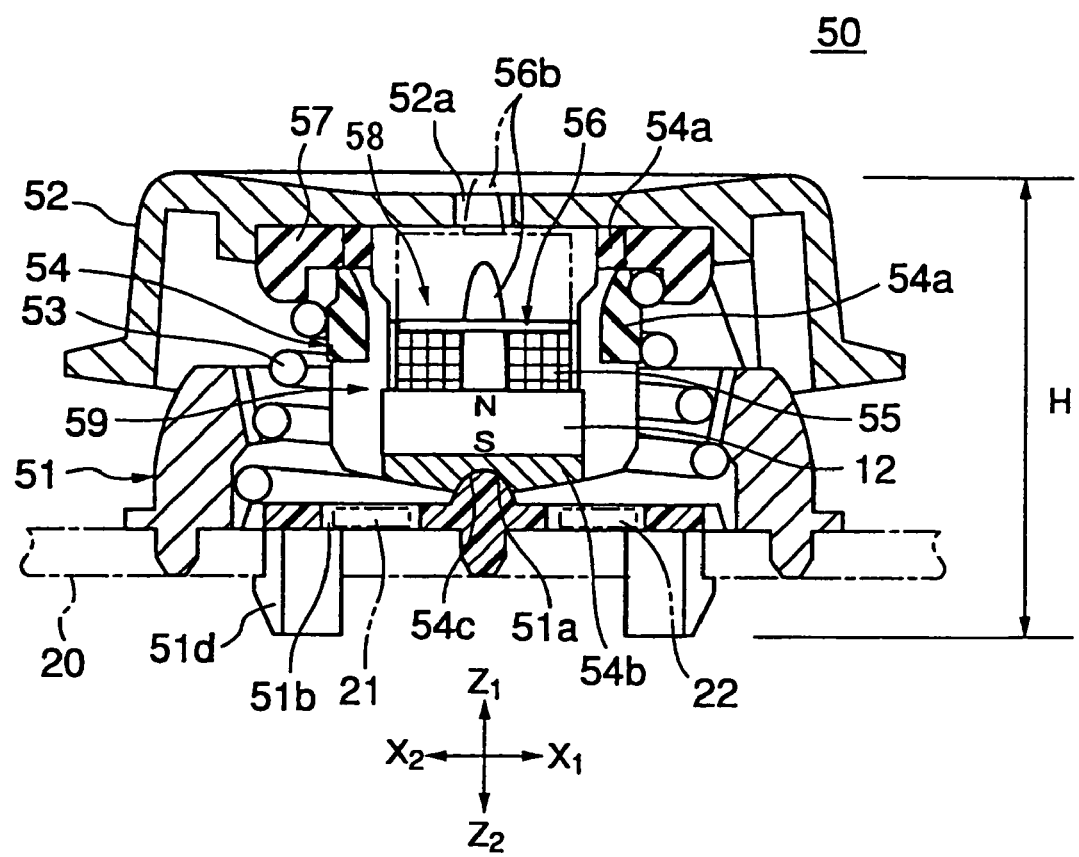
FIG. 4 is an enlarged sectional view of the inputting device as viewed along a line IV-IV illustrated in FIG. 3A.

Herein, when a drive current i1 is supplied to the moveable drive coil 55, with respect to the magnetic flux, a force F1 is generated in the direction of Z1 away from the permanent magnet 12, so as to cause the moveable drive coil 55 to be moved in the direction of Z1 until, as illustrated in FIG. 4 in a two-dot chain line, the projecting member 56 hits the bottom face of the keytop 52, whereby the conic-shaped projecting section 56b projects a little from the hole 52a. When the drive current i1 is shut down, the force F1 disappears, so as to cause the moveable drive coil 55 to move, for example, by gravity and/or another suitable force, in the direction of Z2 so as to be moved back to the original position.

Figure 6:
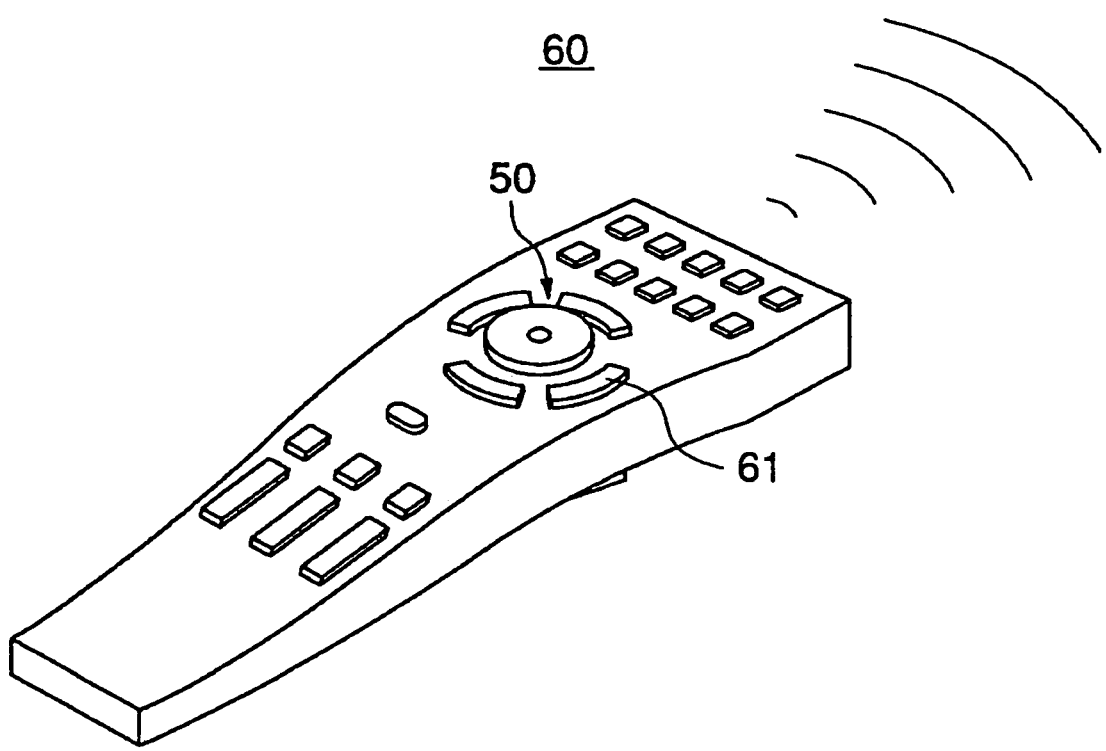
FIG. 6 is a diagram of a remote control unit incorporating the inputting device.
Figure 7:
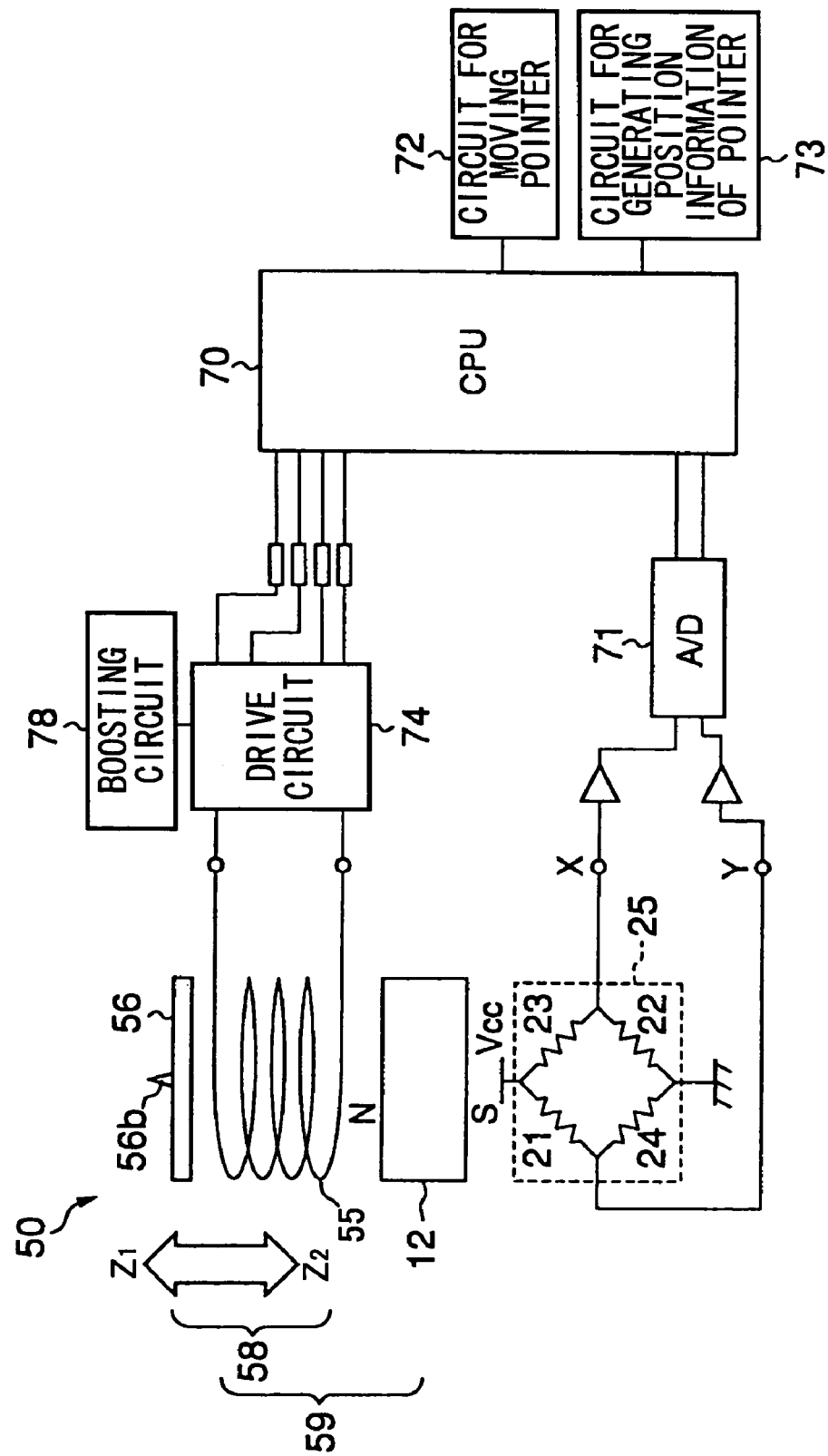
FIG. 7 is a block diagram of portions of the remote control unit illustrated in FIG. 6 relating to the inputting device.

The inputting device 50, as illustrated in FIG. 6, is incorporated at the center of a remote control unit 60. Near the inputting device 50, an execute key 61 is arranged. FIG. 7 is a block diagram of portions of the remote control unit 60 related to the inputting device 50. The Hall elements 21 through 24 are bridge-connected to form a bridge circuit 25, so as to be connected via an A/D-converting circuit 71 to a CPU 70. The CPU 70 has such functions of computing outputs of the Hall elements 21 through 24 so as to produce a signal causing the pointer to be moved across the display screen and of monitoring the position of the pointer on the display screen so as to determine that the pointer has moved to a predetermined area on the display screen. The CPU 70 is connected to such circuits as a circuit for causing the pointer to be moved 72, a circuit generating position information of the pointer 73, and a tactile-stimulating device drive circuit 74. The moveable drive coil 55 is connected to the tactile-stimulating device drive circuit 74. The tactile-stimulating device drive circuit 74 is connected to a boosting circuit 75.

In a state such that the operator has in possession the remote control unit 60, but is not operating the inputting device 50, the permanent magnet 12, as illustrated in FIG. 4, is positioned over the center of the Hall elements 21 through 24 in an equilibrial position relative to the printed circuit board 20. The magnetic field 13 is acting uniformly on the respective Hall elements 21 through 24; the output of the bridge circuit 25 is zero; the output of the A/D converting circuit 71 is zero; and a pointer 85 does not move across a display screen 80.

Figure 8A:
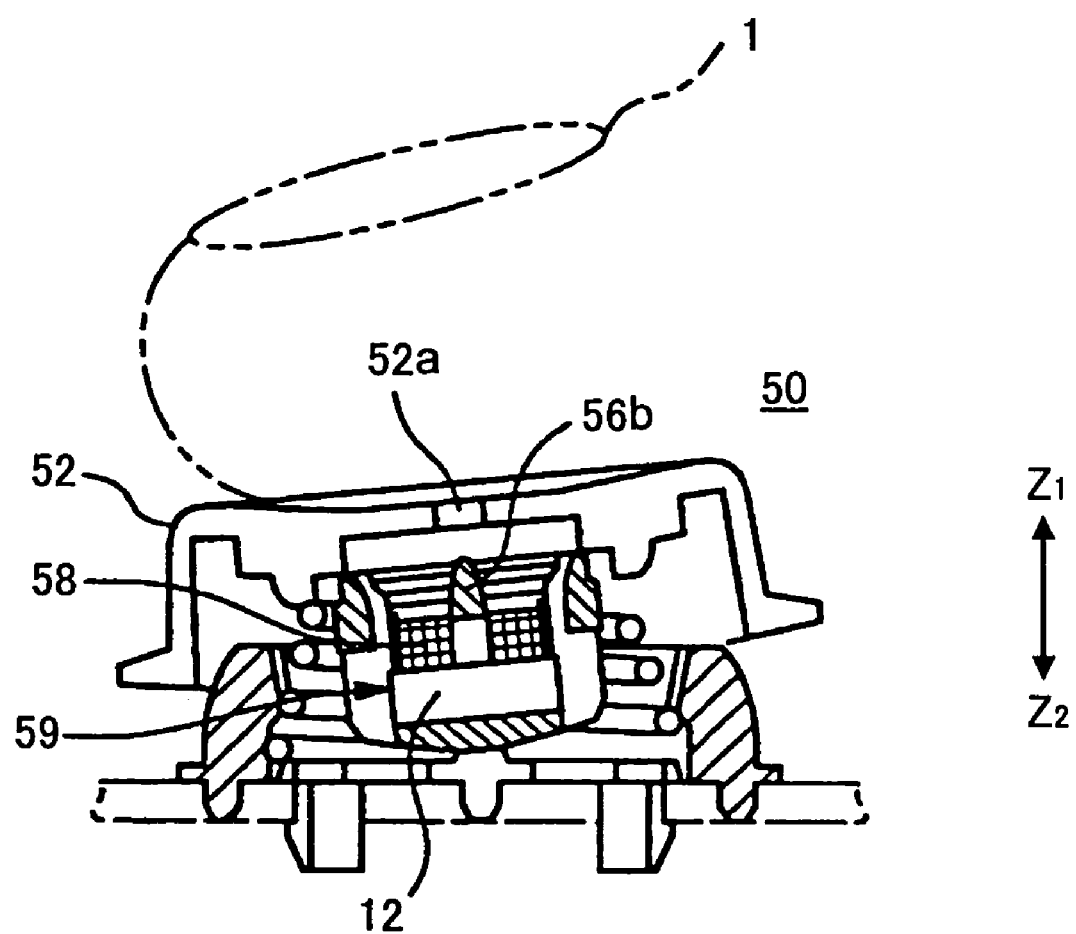
FIG. 8A is a diagram depicting an operation at the remote control unit of the inputting device and an operation of a tactile-stimulating device.
Figure 8B:
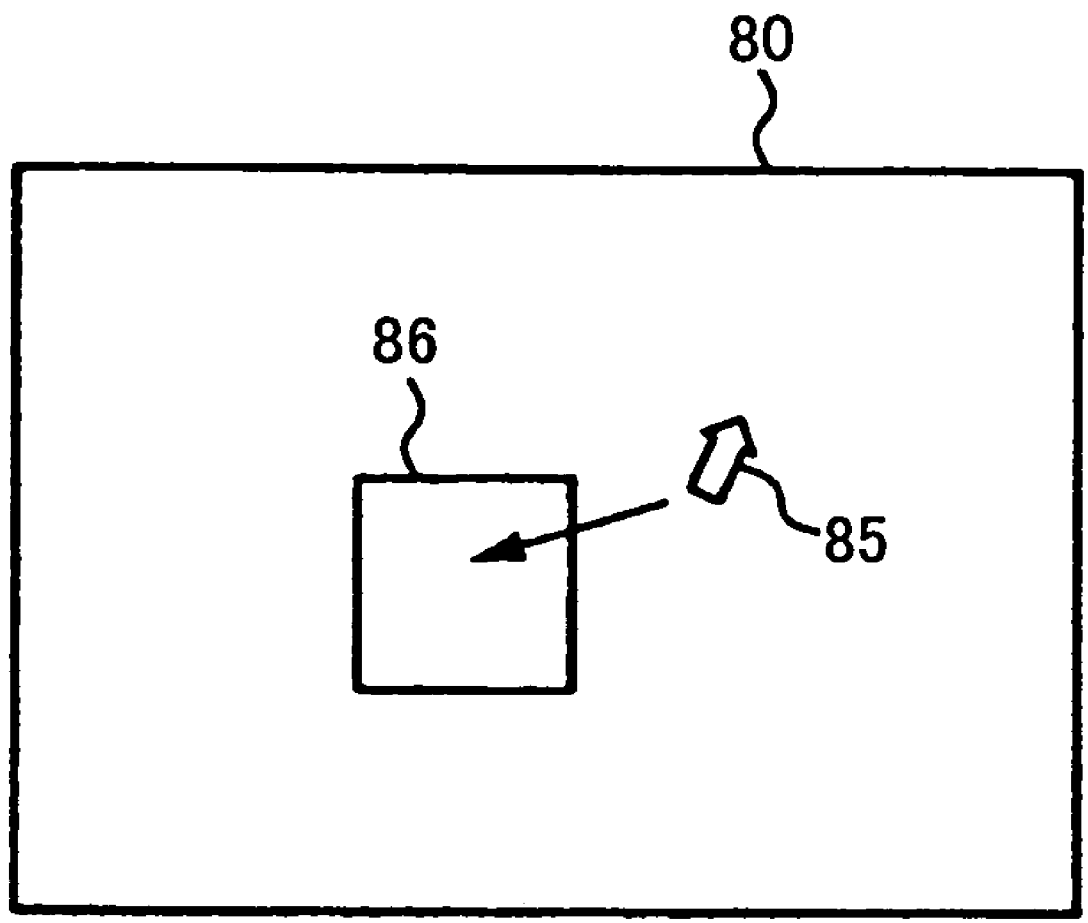
FIG. 8B is a diagram depicting a pointer movement.

When the operator places the fingertip 1 on the keytop 52 so as to cause the fingertip 1 to be moved in a random direction, as illustrated in FIG. 8A, as the keytop 52 is tilted, the permanent magnet 12 is tilted so that its position relative to the Hall elements 21 through 24 changes; the strength of the magnetic field acting on the respective Hall elements 21 through 24 changes; a voltage in response to the tilted direction and the tilted angle of the keytop 52 is output from the bridge circuit 25; the CPU 70 outputs a command to cause the pointer to be moved across the display screen; the circuit for causing the pointer to be moved 72 operates; and the pointer 85 on the display screen 80 as illustrated in FIG. 8B is moved in the direction dependent on the operation of the keytop 52.

Figure 8C:
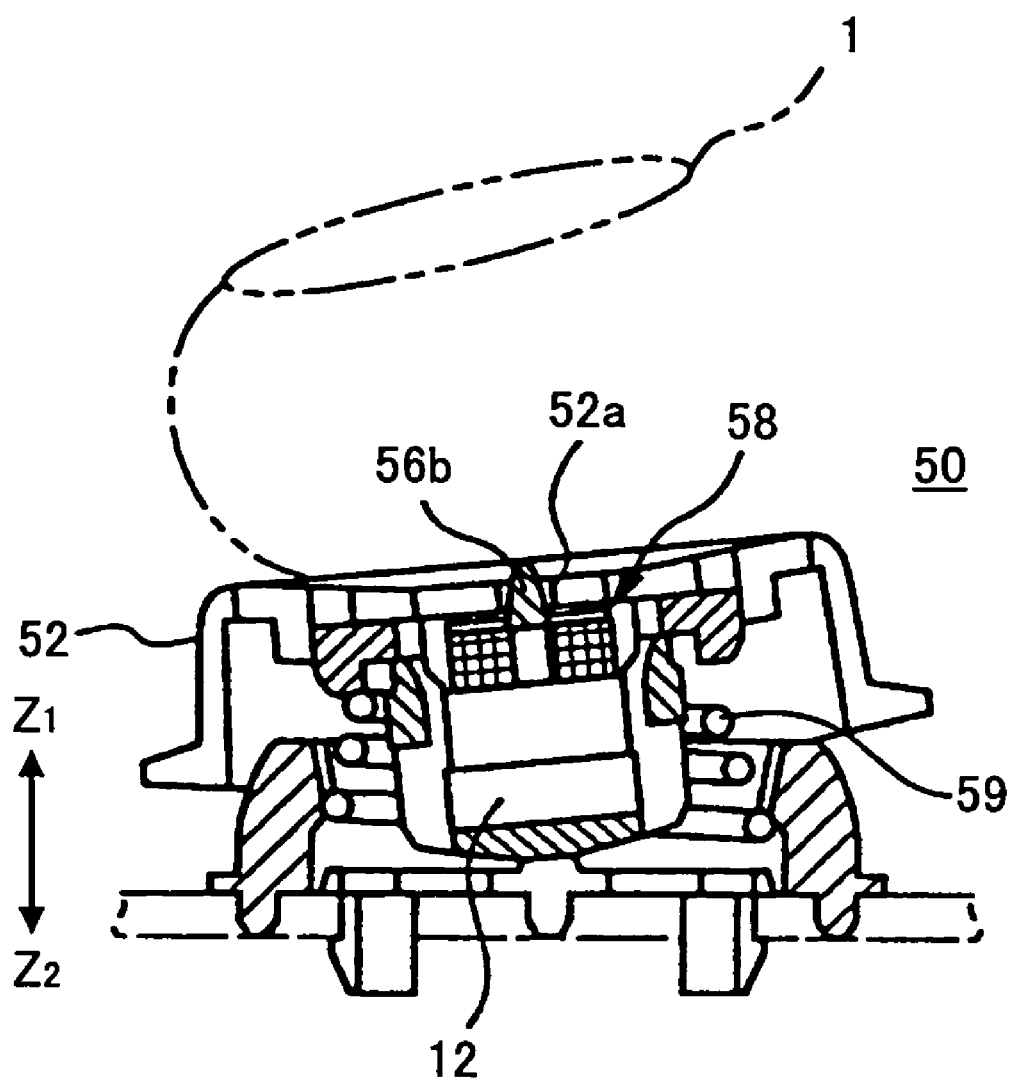
FIG. 8C is another diagram depicting the operation at the remote control unit of the inputting device and the operation of the tactile-stimulating device.
Figure 8D:
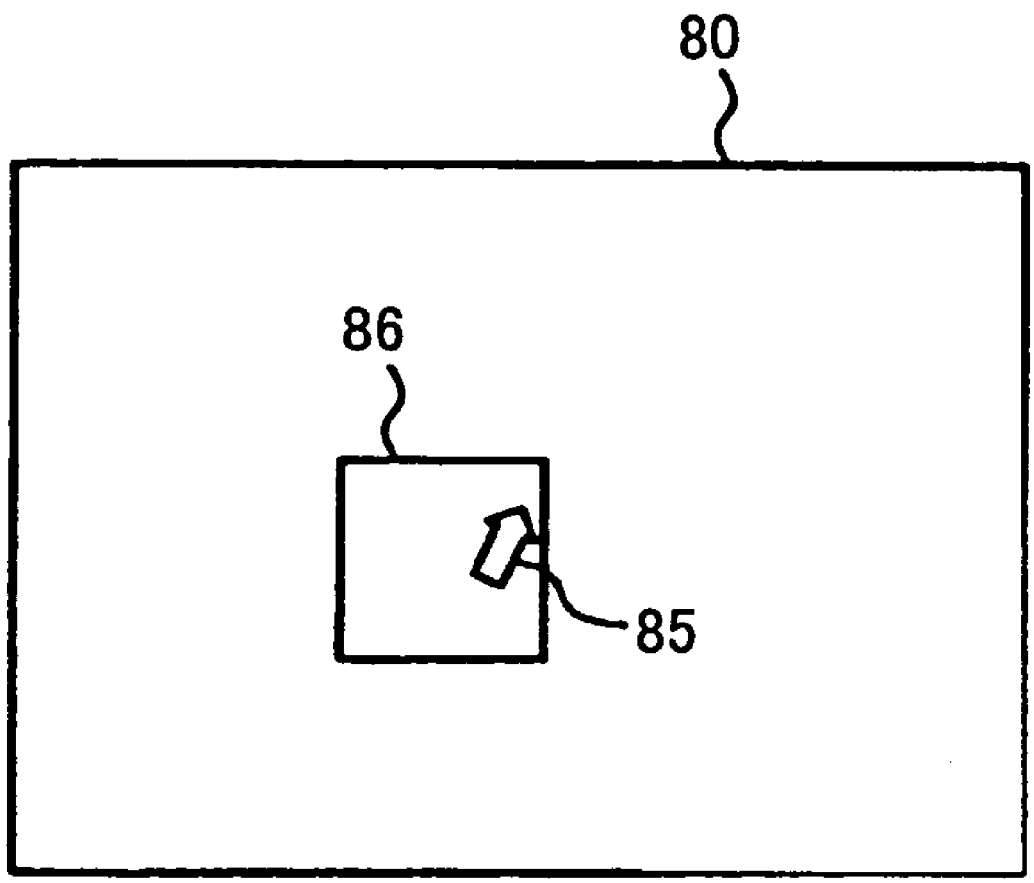
FIG. 8D is another diagram depicting the pointer movement.

When the pointer 85 moves so as to enter a predetermined area 86, as illustrated in FIG. 8D, the CPU 70 outputs the signal to the tactile-stimulating device drive circuit 74, and the tactile-stimulating device drive circuit 74 operates with the boosting circuit 75, so that the drive current i1 is temporarily and furthermore repeatedly supplied to the moveable drive coil 55. As a result, the moveable drive coil 55 is actuated by the electromagnetic force in the direction of Z1 as illustrated in FIG. 8C, and the conic-shaped projecting section 55b causes a portion of a finger 1 blocking the hole 52a to be projected upwards, so as to stimulate the tactile sense of the portion of the finger 1 (for example, a Meisner's corpuscle). Herein, as the finger 1 stimulated with impact by the conic-shaped projecting section 55b is performing the operation so that an attention is being concentrated, the stimulus felt by the operator is larger relative to a case in which, for example, a finger not involved in the operation is pushed with impact by the conic-shaped projecting section 55*b*.

The operator, when having the tactile sense of the finger 1 stimulated, releases the finger 1 from the keytop 52 and at the same time, shortly thereafter, pushes the execute key 61. Hereby, the computer executes a predetermined operation corresponding to a display at an area 86. Thus, the operator is enabled, without carefully observing the movement of the pointer 85 across the screen 80, to recognize as a feedback the fact that the pointer 85 has pointed the area 86, thereby enabling, even in, for example, a state of continuing to operate for such a long time so as to show signs of fatigue, an efficient and reliable performing of the operation of the remote control unit 60.

When the drive current i1 is set to be zero, the tactile-stimulating element 58 by gravity, or other force, is lowered so as to be moved back to its original position.

Herein, over the top face of the keytop 52, a thin sheet may be mounted so as to block the hole 52*a*. In this case, the stimulus to the finger 1 when having operated the tactile-stimulating device 59 is caused to be mild.

The drive current i1 may be set to have a pulse shape. In such a case, the tactile-stimulating device 59 is repeatedly operated so that the tactile sense of the finger 1 is repeatedly stimulated. Referring to FIG. 18B, the drive current i1 may be set to have an alternating waveform so as to cause the electromagnetic force to be used for restoring the tactile-stimulating element 58. Herein, even when the position of the remote control unit 60 is such that its front and back are reversed, the tactile-stimulating device 59 operates in the same manner as when the remote control unit 60 is at its non-reversed position.

Next, the respective embodiments are described.

(Embodiments of the Tactile-Stimulating Element 58)

Figure 9A:
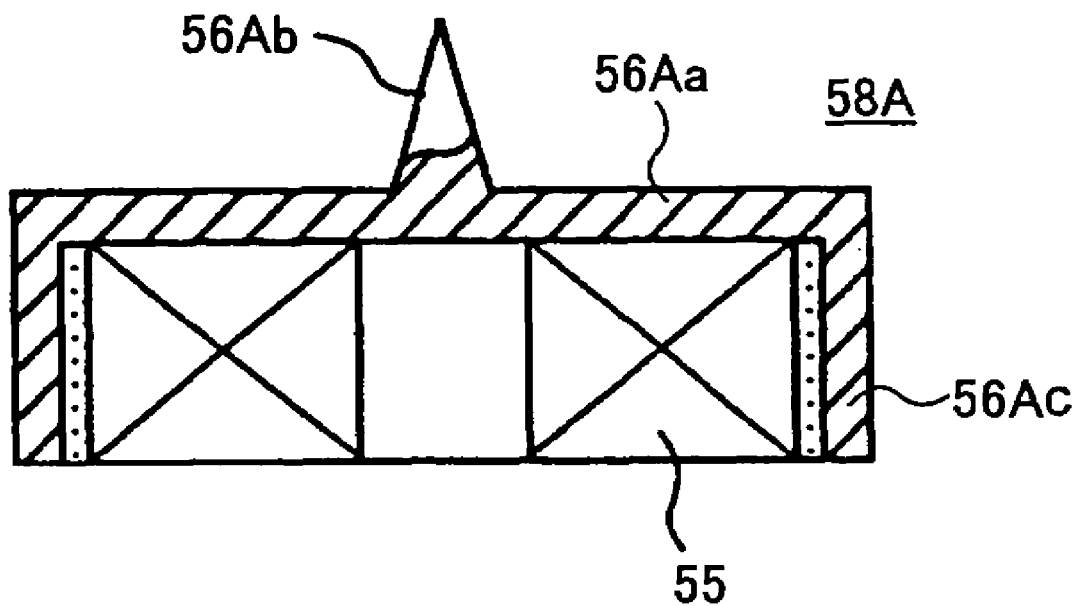
FIG. 9A is a diagram of an embodiment of a tactile-stimulating element.

A tactile-stimulating element 58A in FIG. 9A is configured to have the moveable drive coil 55 fitted into the inner part of a cylindrical section 56Ac, with a top plate 56Aa, and projecting section 56Ab adhered thereto.

Figure 9B:
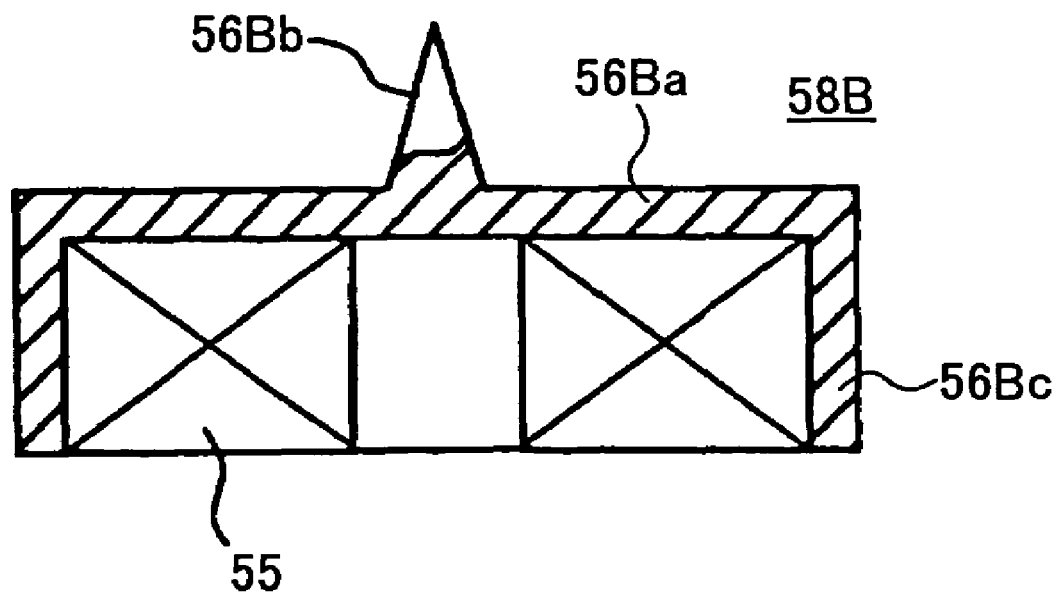
FIG. 9B is a diagram of another embodiment of the tactile-stimulating element.

A tactile-stimulating element 58B in FIG. 9B is configured to have the moveable drive coil 55 insert-molded. A cylindrical section 56Bc with the top plate 56Ba, and a conic-shaped projecting section 56Bb are parts formed at the time of insert-molding the moveable drive coil.

Figure 9C:
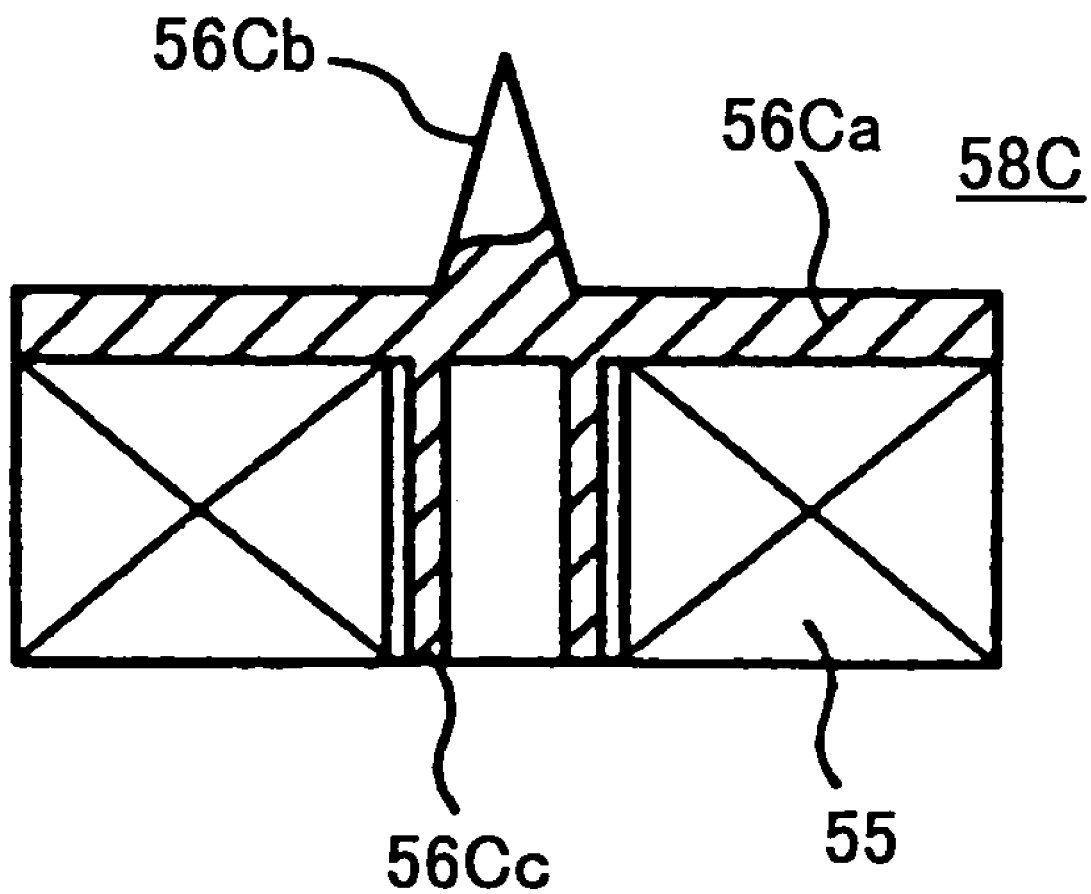
FIG. 9C is a diagram of yet another embodiment of the tactile-stimulating element.

A tactile-stimulating element 58C in FIG. 9C has a projecting member 56C having a bobbin 56Cc, and has the moveable drive coil 55 formed around the bobbin 56Cc of the projecting member 56C.

(Embodiments of the Projecting Member 55)

Figure 10A:
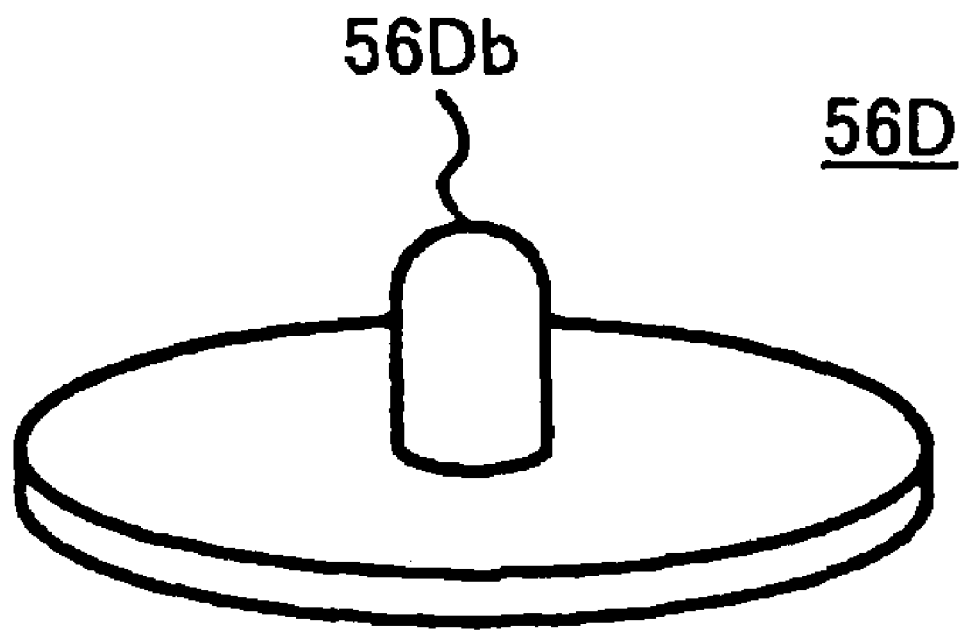
FIG. 10A is a diagram of an embodiment of a projecting member.

A projecting member 56D in FIG. 10A includes a projecting section 56 Db having the shape of a cylinder with a diameter of around 1 mm, for example, and a tip which, in this embodiment, is semispherical-shaped.

Figure 10B:
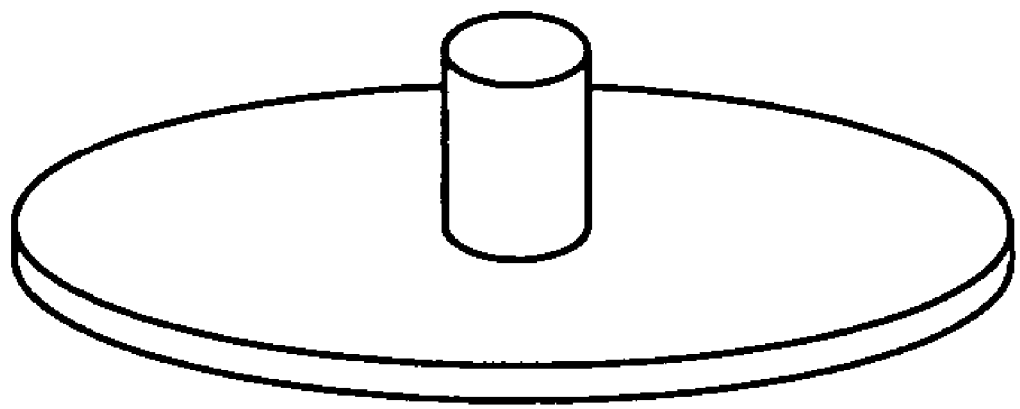
FIG. 10B is a diagram of another embodiment of the projecting member.
Figure 10C:
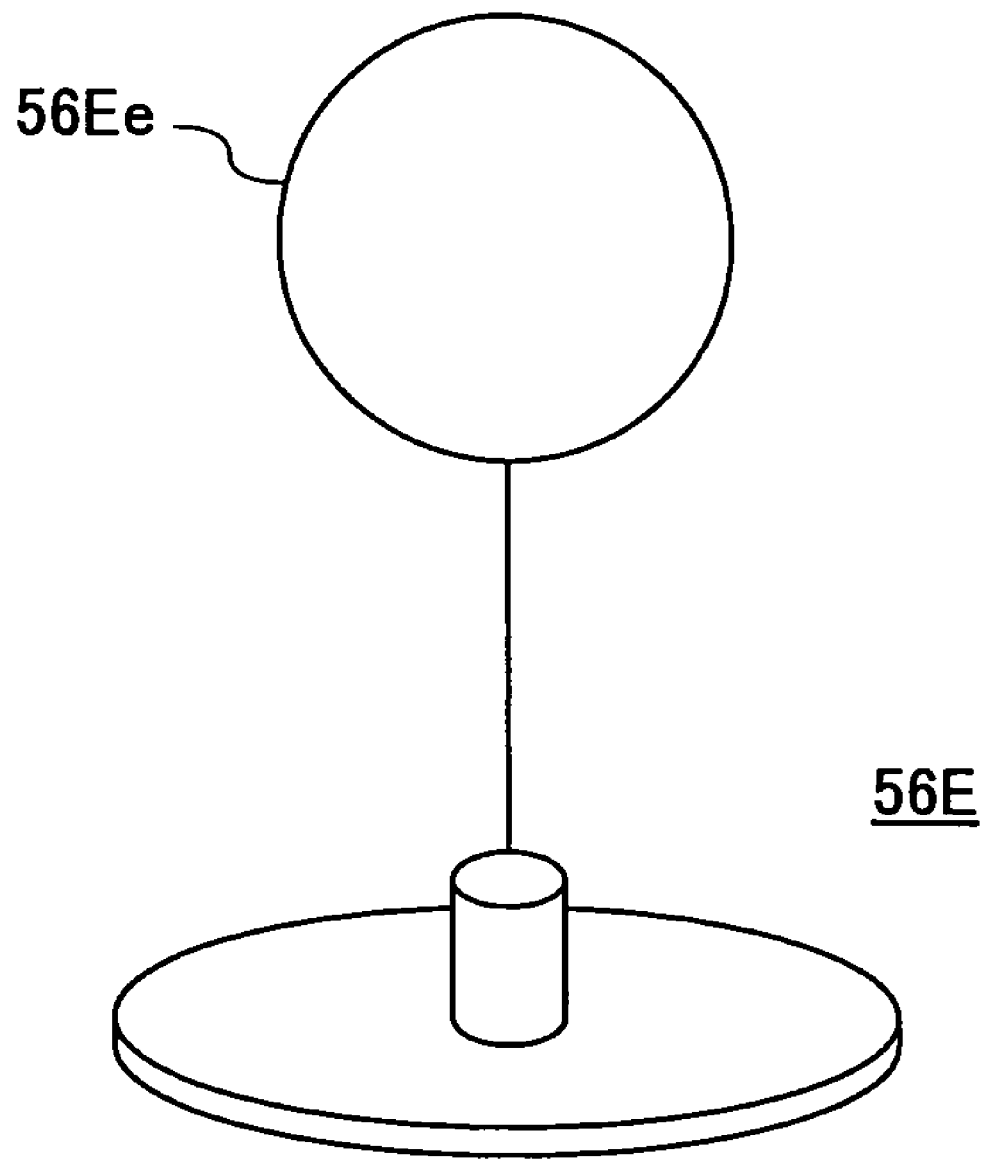
FIG. 10C is a diagram of yet another embodiment of the projecting member.
Figure 10D:
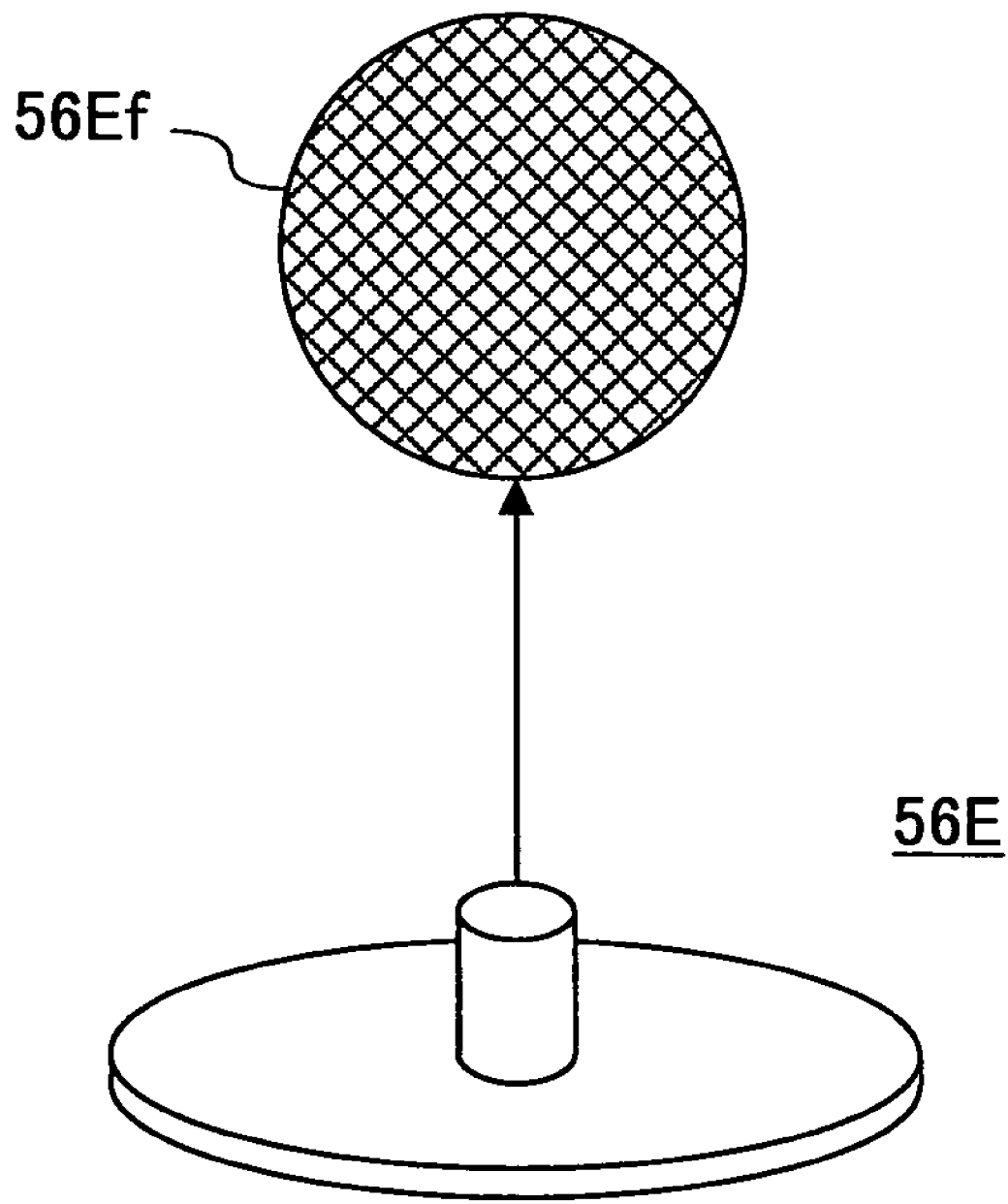
FIG. 10D is a diagram of yet another embodiment of the projecting member.
Figure 10E:
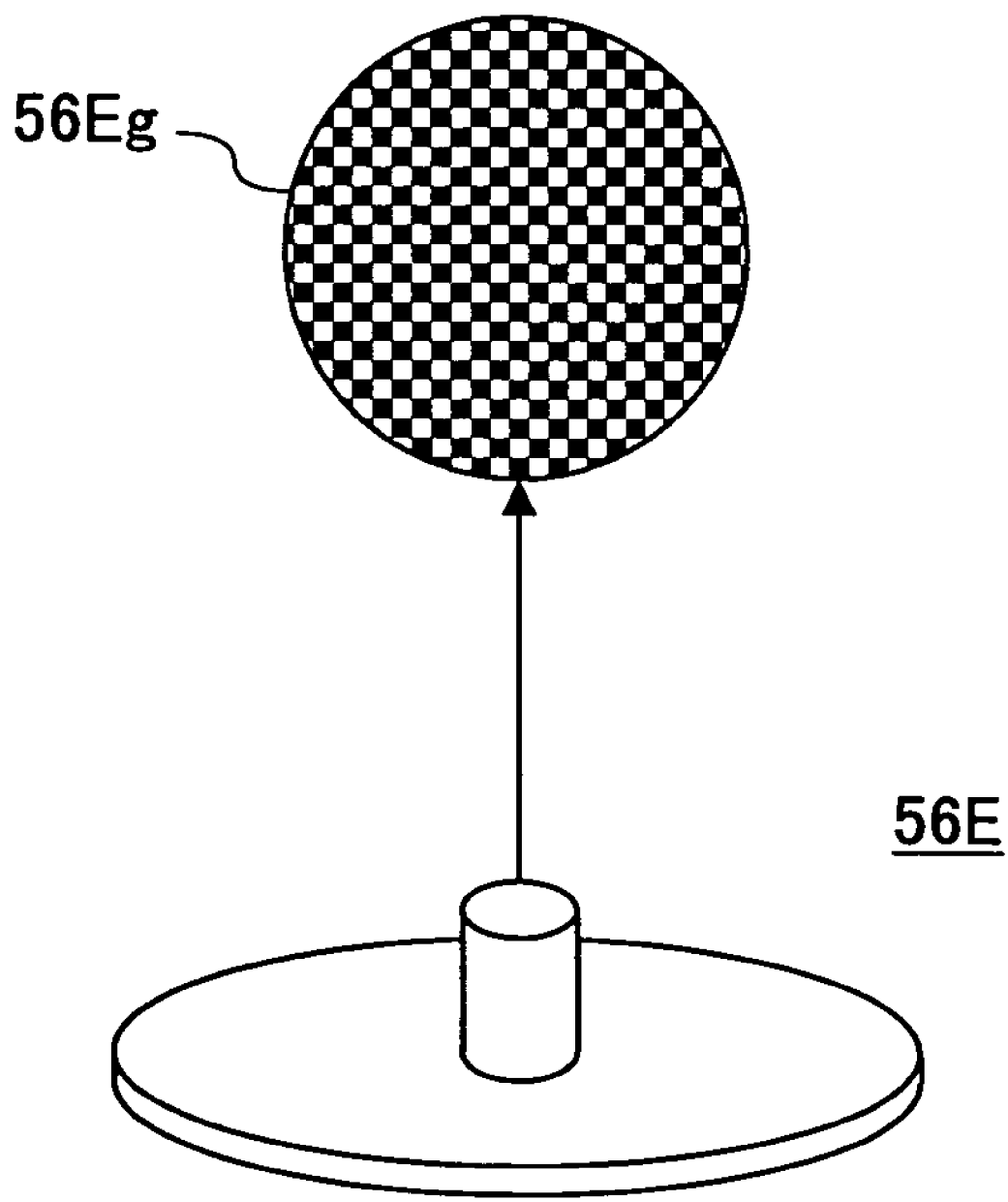
FIG. 10E is a diagram of yet another embodiment of the projecting member.

A projecting member 56E in FIG. 10B has a shape of a cylinder with a diameter of around 1 mm, for example, and a tip with a flat plane 56Ee as illustrated in FIG. 10C, a face 56Ef which is a flat plane on which micro-sized ribs have been formed in a grid pattern as illustrated in FIG. 10D, or a face 56Eg which is a flat plane to which micro-sized projections have been disposed in a matrix pattern as illustrated in FIG. 10E.

Figure 10F:
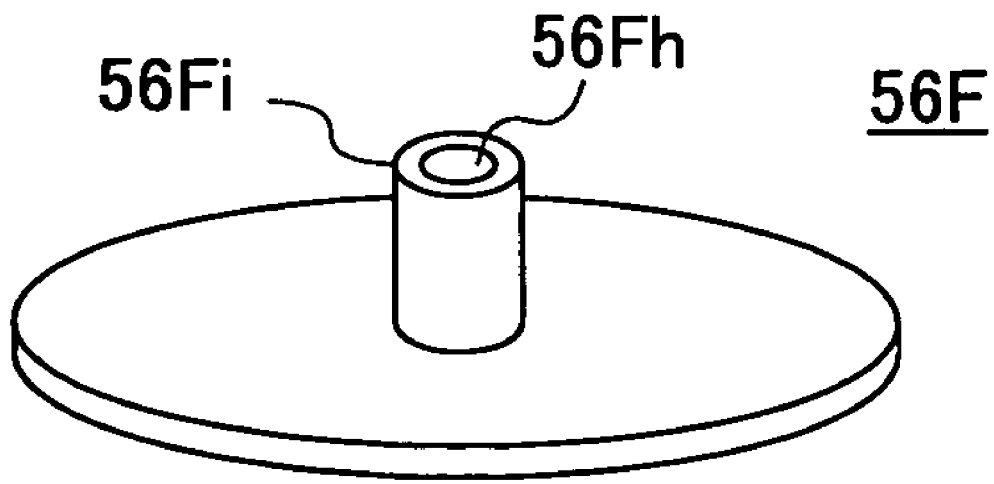
FIG. 10F is a diagram of yet another embodiment of the projecting member.
Figure 10G:
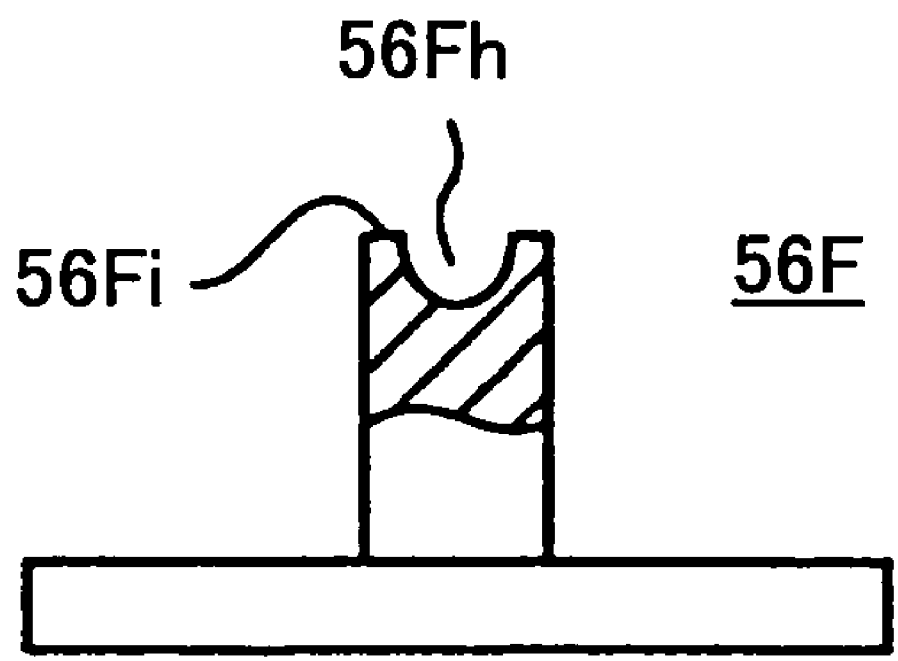
FIG. 10G is a diagram of yet another embodiment of the projecting member.

A projecting member 56F in FIG. 10F and FIG. 10G has a shape of a cylinder with a diameter of around 1 mm, for example, and has a concave section 56Fh formed in the front-end face, and is configured to have formed, around the tip of the cylinder, a ring-shaped projecting section 56Fi.

Figure 10H:
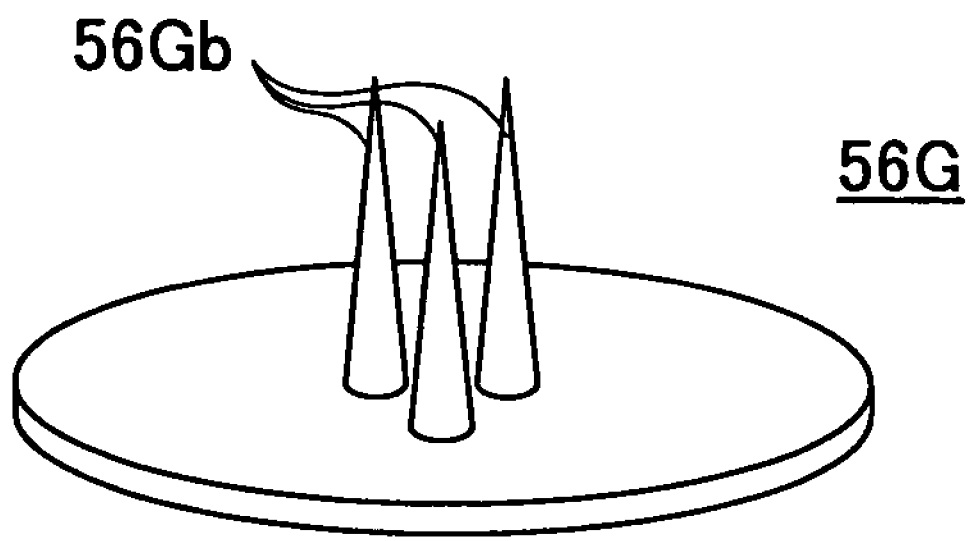
FIG. 10H is a diagram of yet another embodiment of the projecting member.

A projecting member 56G in FIG. 10H is configured to have three conic-shaped projecting sections 56 Gb arranged in a cluster.

(Embodiments of the Drive Portion of the Tactile-Stimulating Device 59)

Figure 11A:
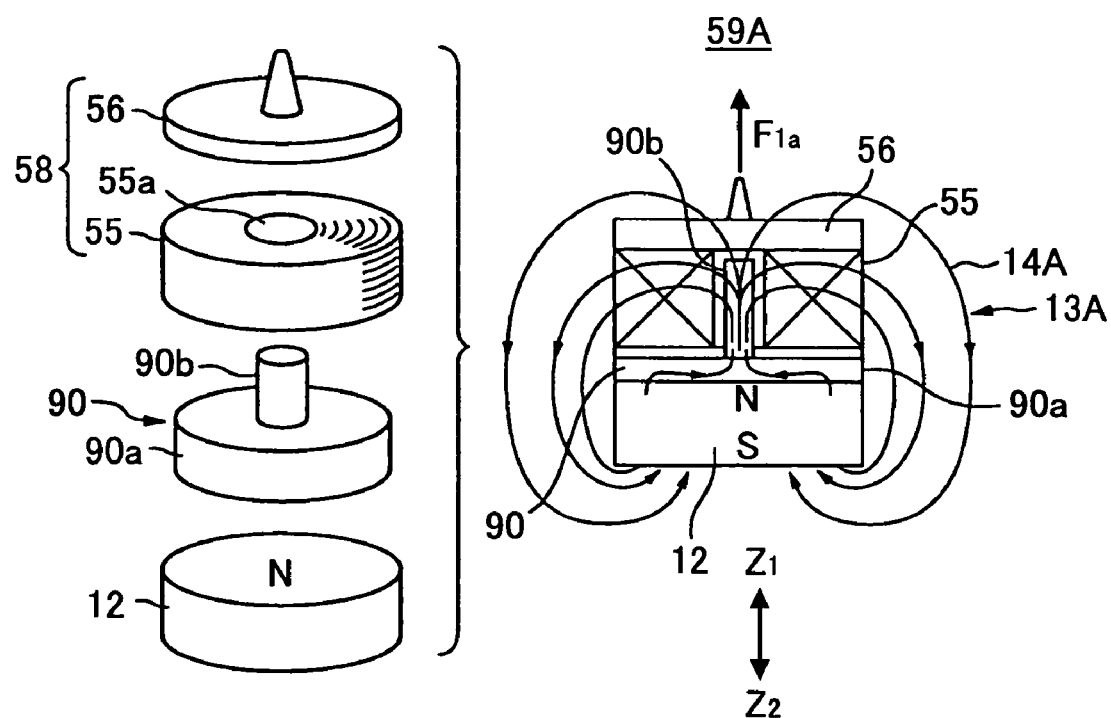
FIG. 11A is a diagram of an embodiment of a drive portion of the tactile-stimulating device.
Figure 11B:
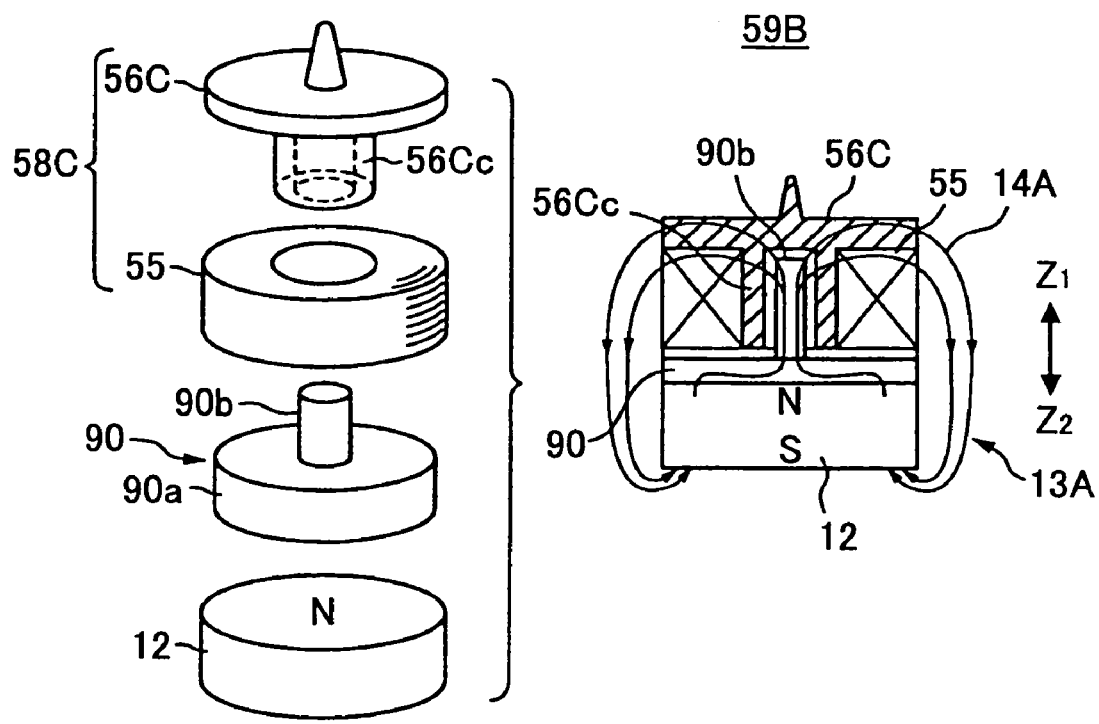
FIG. 11B is another diagram of the embodiment of the drive portion of the tactile-stimulating device.
Figure 12A:
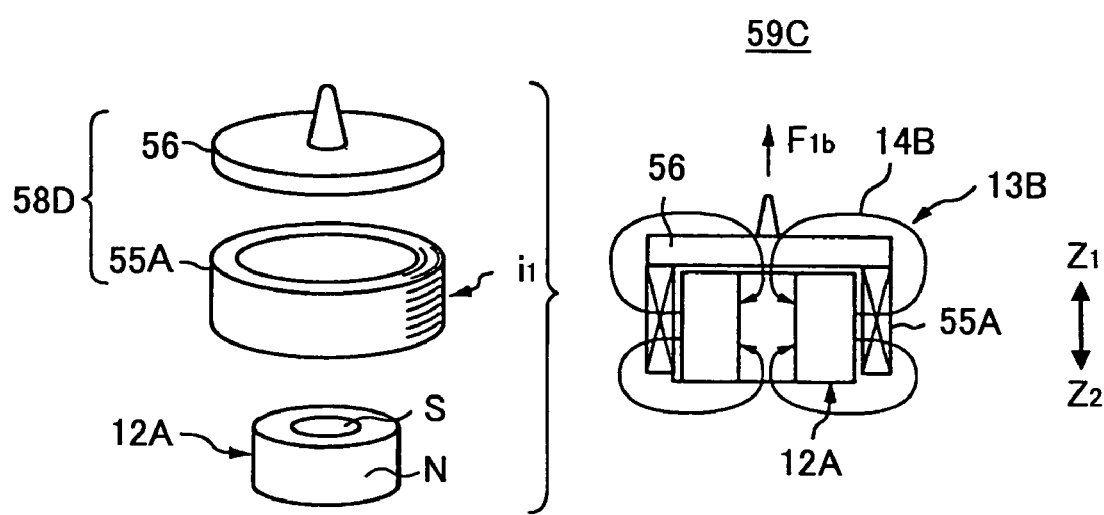
FIG. 12A is a diagram of another embodiment of a drive portion of the tactile-stimulating device.
Figure 12B:
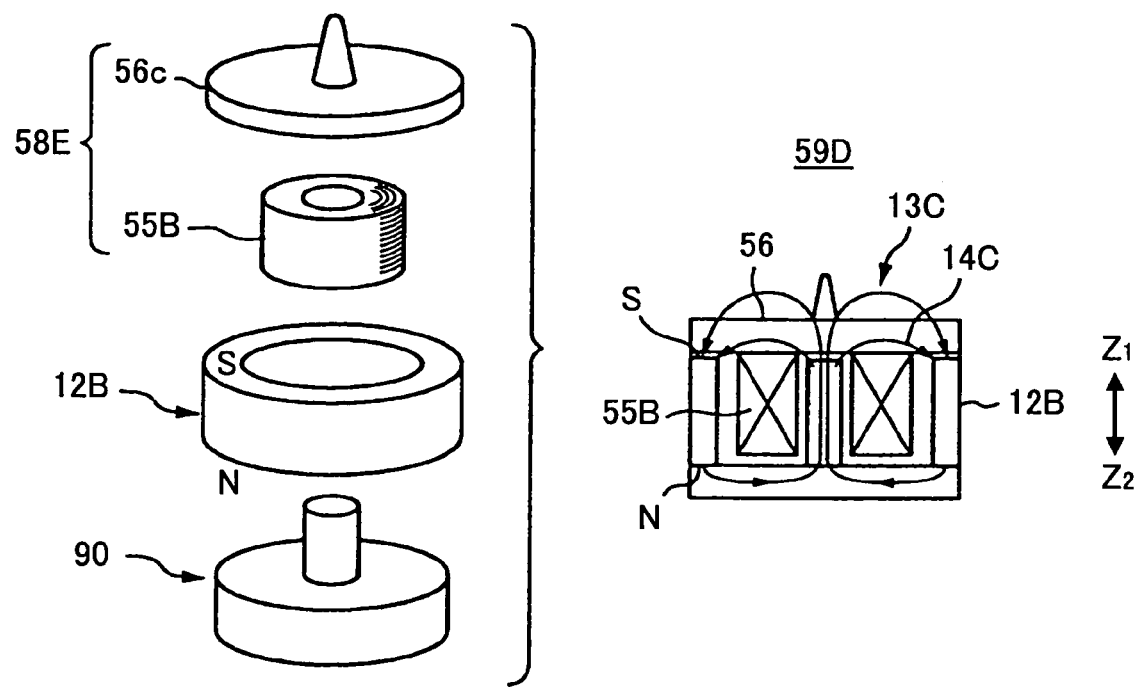
FIG. 12B is another diagram of another embodiment of the drive portion of the tactile-stimulating device.
Figure 13:
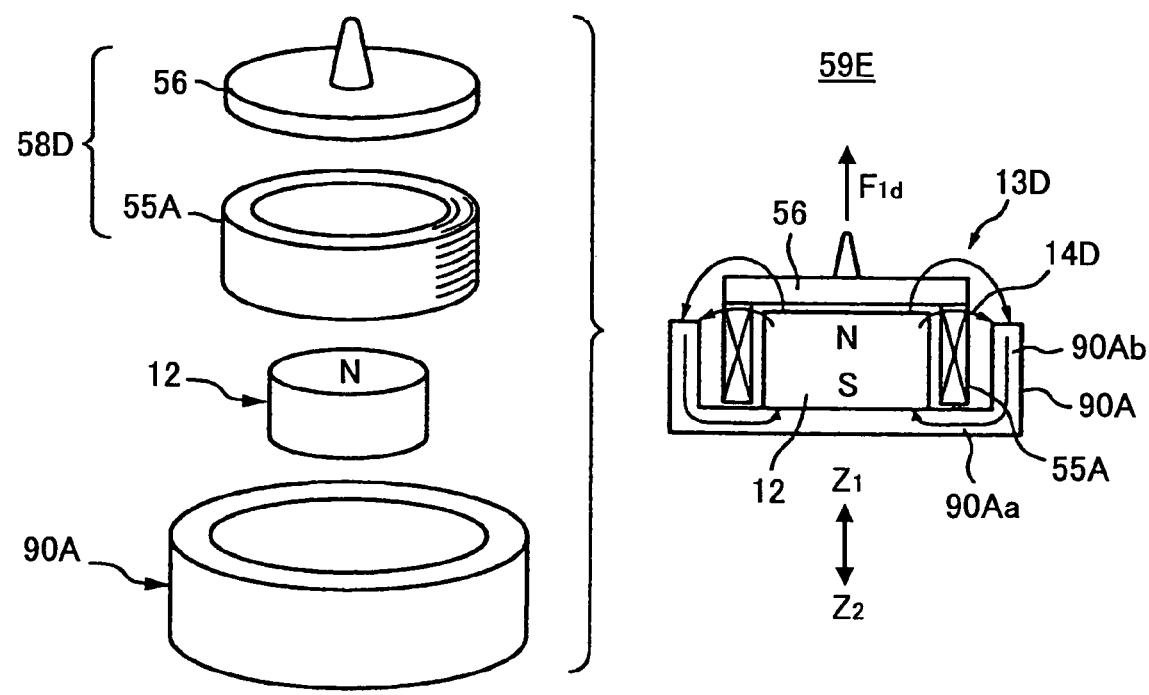
FIG. 13 is a diagram of yet another embodiment of a drive portion of the tactile-stimulating device.

The tactile-stimulating apparatuses illustrated in FIG. 11A, FIG. 11B, FIG. 12B, and FIG. 13 are structured to have a yoke. The tactile-stimulating apparatuses illustrated in FIG. 12A, FIG. 12B, and FIG. 13 are structured to have concentrically arranged permanent magnet and a moveable drive coil.

A tactile-stimulating apparatus 59A illustrated in FIG. 11A is configured to have a yoke 90 added to, for example, the tactile-stimulating apparatus 59 illustrated in FIG. 5. The yoke 90 includes a circular-plate section 90*a* and a cylindrically-shaped section 90*b* projecting from the center thereof. The bottom of the circular-plate section 90*a* is fixed to the N-pole face of the permanent magnet 12. The cylindrically-shaped section 90*b* projects into a feed hole 55*a* of the moveable drive coil 55.

The yoke 90 causes the state of a magnetic field 13A to be changed so as to cause the magnetic lines of force, as represented by the alphanumeric reference 14A, to come out in the radial direction primarily from the front-end side of the cylindrically-shaped section 90*b*. Further, the yoke 90 causes the horizontal components of the magnetic lines of force acting on the respective turn sections of the moveable drive coil 55 to be larger relative to a case where the yoke 90 is not provided. Furthermore, even in a state in which the moveable drive coil 55 is caused to be moved in the direction of Z1, the yoke 90 causes the magnitude of a reducing of the horizontal components of the magnetic lines of force acting on the respective turn sections of the moveable drive coil 55 to be small, so that, even if the moveable drive coil 55 is caused to be moved in the direction of Z1, the respective turn sections still continue to receive strong horizontal components of the magnetic lines of force. Thus, the force F1*a* produced when the drive current i1 is delivered to the moveable drive coil 55 is caused to be stronger relative to the case where the yoke 90 is not provided, thereby enabling the tactile-stimulating element 58 to be efficiently driven.

A tactile-stimulating device 59B in FIG. 11B is configured to have provided, in lieu of, for example, the tactile-stimulating element 58 within the tactile-stimulating device 59A, a tactile-stimulating element 58C illustrated in FIG. 9C. The tactile-stimulating element 58C includes a bobbin 56Cc guided by a cylindrically-shaped section 90*b* of the yoke 90 so as to move up and down. With slidable movement between the bobbin 56Cc and the cylindrically-shaped section 90*b*, the tactile-stimulating element 58C moves up and down more smoothly relative to the tactile-stimulating element 58 in FIG. 11A.

A tactile-stimulating device 59C in FIG. 12A includes a permanent magnet 12A and a moveable drive coil 55A. The permanent magnet 12A has a tubular shape, is magnetized in the diametrical direction, whereby the inner-peripheral face is the S pole and the outer-peripheral face is the N pole. The moveable drive coil 55A is arranged on the outer side of the permanent magnet 12A so as to surround the permanent magnet 12A.

A magnetic field is formed as represented by the alphanumeric reference 13B and the magnetic lines of force are formed as represented by the alphanumeric reference 14B so that components crossing the moveable drive coil 55A in the horizontal direction increase. Therefore, a force F1b produced when the drive current i1 is delivered to the moveable drive coil 55A is strong. The embodiment as described above is suitable in, for example, a case of minutely controlling the up-and-down movement of the tactile-stimulating element 58D.

A tactile-stimulating device 59D in FIG. 12B includes a permanent magnet 12B, a moveable drive coil 55B, and a yoke 90. The permanent magnet 12B has a tubular shape, is magnetized in the axial direction, whereby the upper face is the S pole, and the lower face is the N pole, and is fixed to the yoke 90, and surround the moveable drive coil 55B. A magnetic field is generated as represented by the alphanumeric reference 13C, and magnetic lines of force are generated as represented by the alphanumeric reference 14C.

A tactile-stimulating device 59E in FIG. 13 includes a permanent magnet 12, a moveable drive coil 55A, and a yoke 90A. The yoke 90A has a cup shape, and includes a circular-shaped bottom-plate section 90Aa, and a ring-shaped wall section 90Ab. The permanent magnet 12 is fixed to the bottom-plate section 90Aa. The moveable drive coil 55A is held between the permanent magnet 12 and the ring-shaped wall section 90Ab. The permanent magnet 12, the moveable drive coil 55A, and the yoke 90A have a similar arrangement as a magnetic-circuit section of a generally-available speaker.

A magnetic field is formed as represented by the alphanumeric reference 13D and magnetic lines of force are formed as represented by the alphanumeric reference 14D, reducing to a small level a decrease in a force F1d resulting from the fact that the moveable drive coil 55A has moved in the direction of Z1.

Furthermore, with respect to a drive portion of a tactile-stimulating device, in accordance with an embodiment of the invention, the moveable drive coil 55A may be fixed on its lower side to the yoke 90Aa, the permanent magnet 12 may be moveable in the upward and the downward directions, and the projecting member 56 may be fixed to the upper face of the permanent magnet 12. In this way, when a drive current is supplied to the moveable drive coil 55A, the permanent magnet 12 is repelled so as to be caused to move in the upward direction.

(Embodiments of the Tactile-Stimulating Device 59)

Figure 14A:
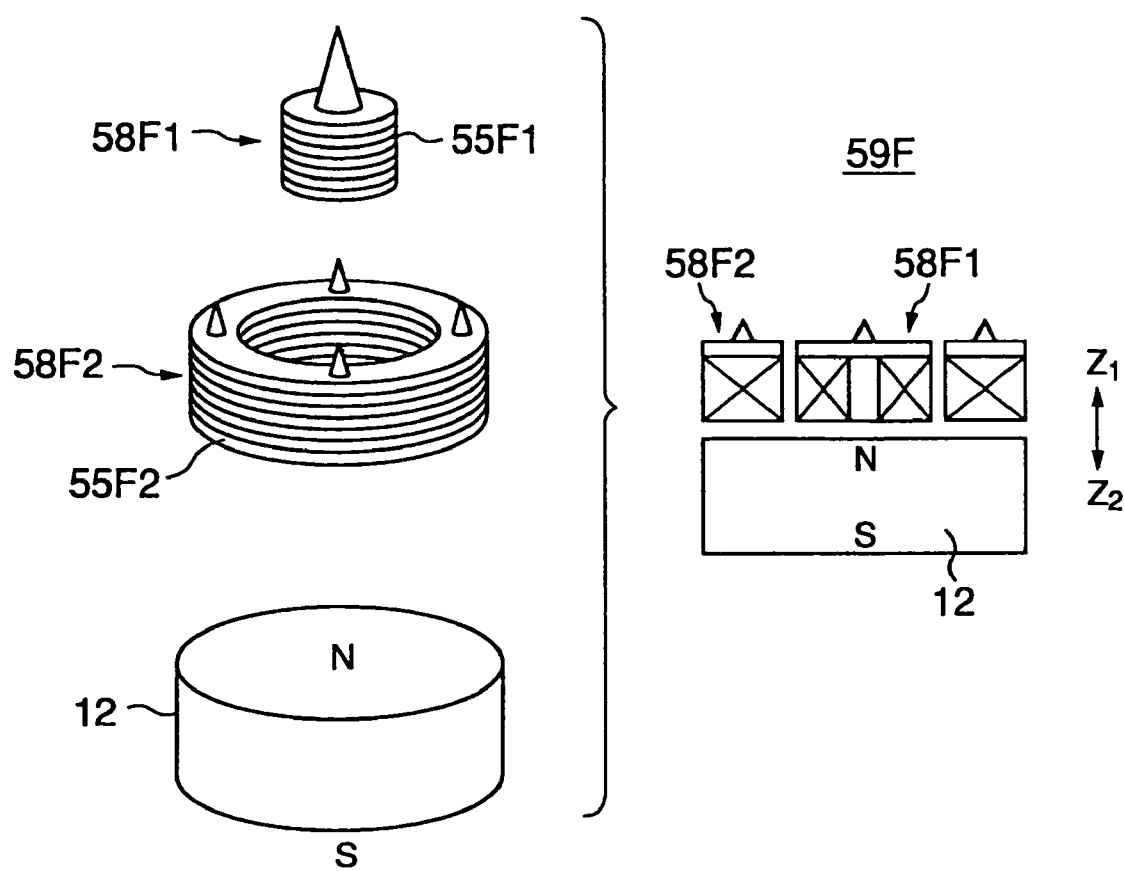
FIG. 14A is a diagram of an embodiment of the tactile-stimulating device.

A tactile-stimulating device 59F in FIG. 14A is configured to provide two tactile-stimulating elements, the respective elements independently making up-and-down movements.

As illustrated in FIG. 14A, the tactile-stimulating device 59F is configured to have a first tactile-stimulating element 58F1 positioned at the center thereof and a ring-shaped second tactile-stimulating element 58F2 surrounding the first tactile-stimulating element 58F1, having placed these elements on the permanent magnet 12. The respective first and second tactile-stimulating elements 58F1 and 58F2 has individually a corresponding moveable drive coil 55F1, 55F2.

Figure 14B:
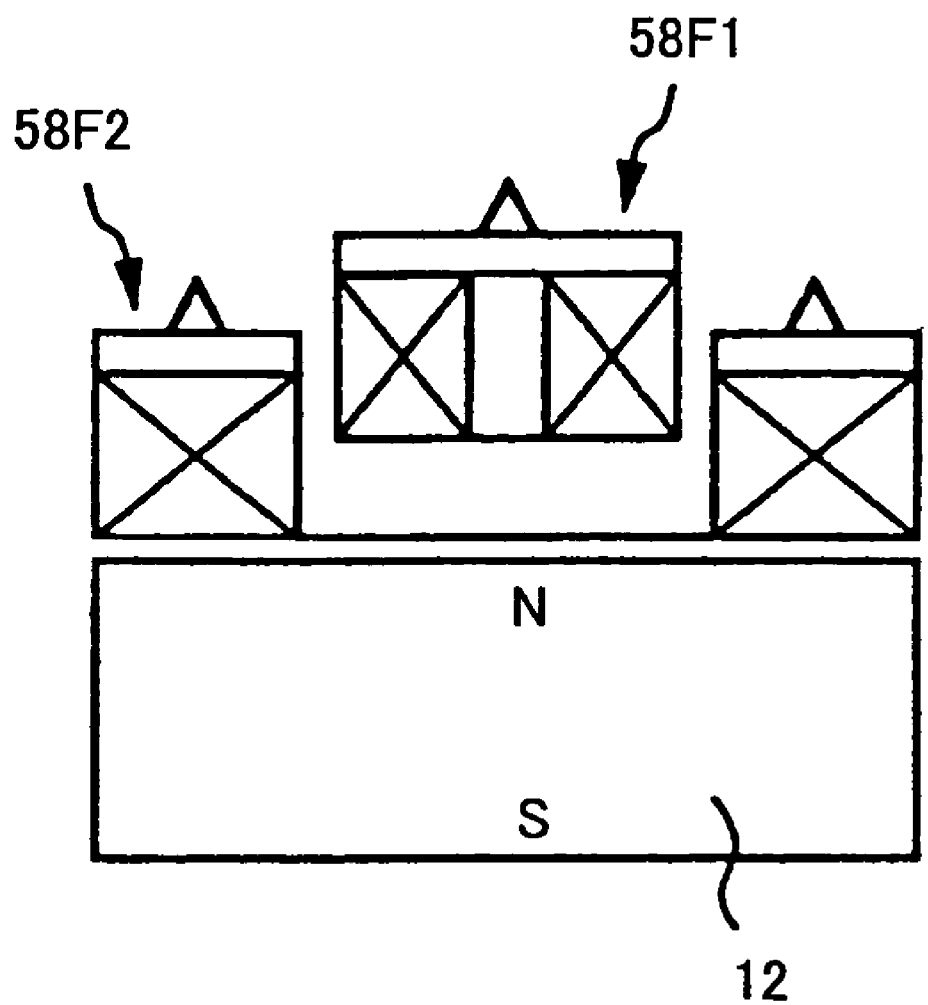
FIG. 14B is another diagram of the embodiment of the tactile-stimulating device.
Figure 14C:
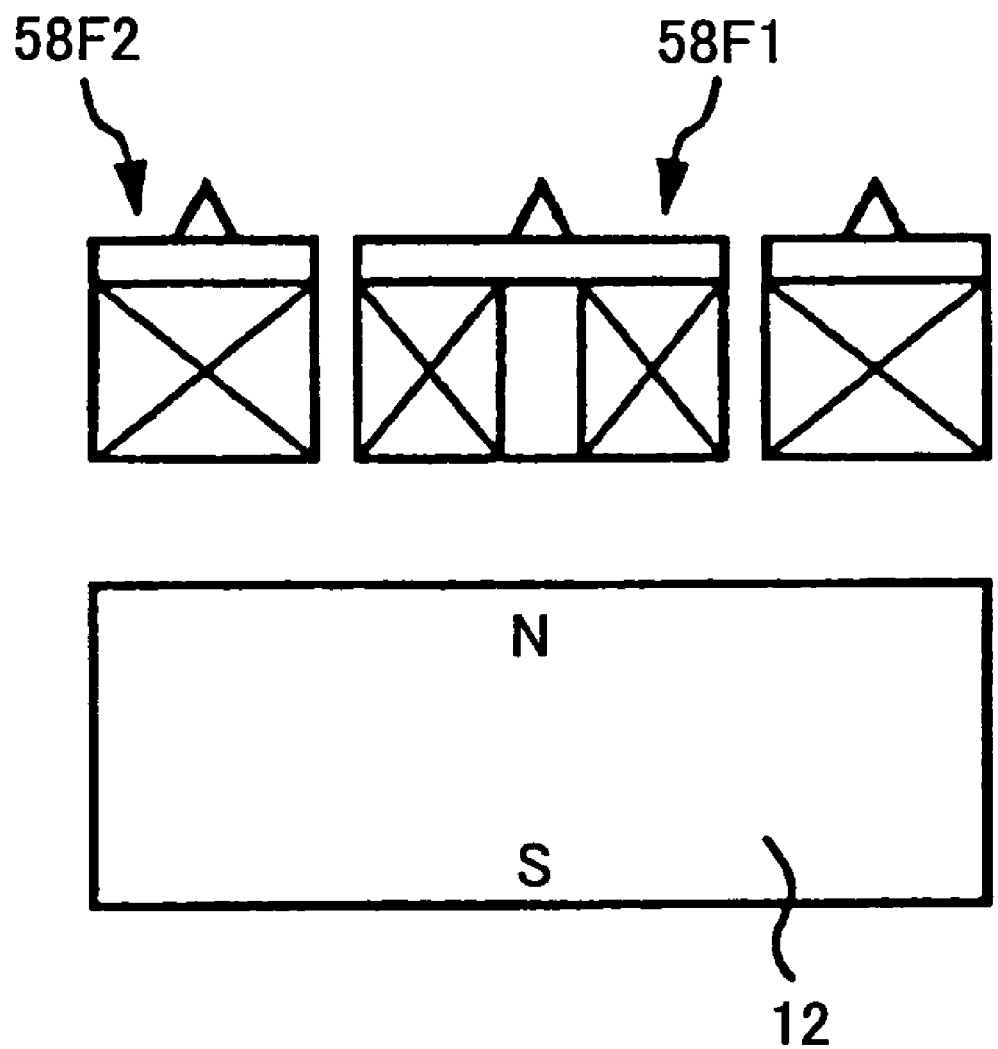
FIG. 14C is yet another diagram of the embodiment of the tactile-stimulating device.

In accordance with this embodiment, when a pointer on a display screen moves so as to enter a predetermined area, first a driving pulse current is delivered to the moveable drive coil 55F1, and then, the driving pulse current is delivered also to the moveable drive coil 55F2. Hereby, first the first tactile-stimulating element 58F1 is caused to be raised as illustrated in FIG. 14B, and next, the second tactile-stimulating element 58F2 is caused to be raised as illustrated in FIG. 14C. Therefore, stimuli are provided to the fingertip in two stages. As will be appreciated, the keytop (not shown) may have one or a plurality of holes through which the projecting sections of the first and second tactile-stimulating elements 58F1 and 58F2 project.

Figure 15:
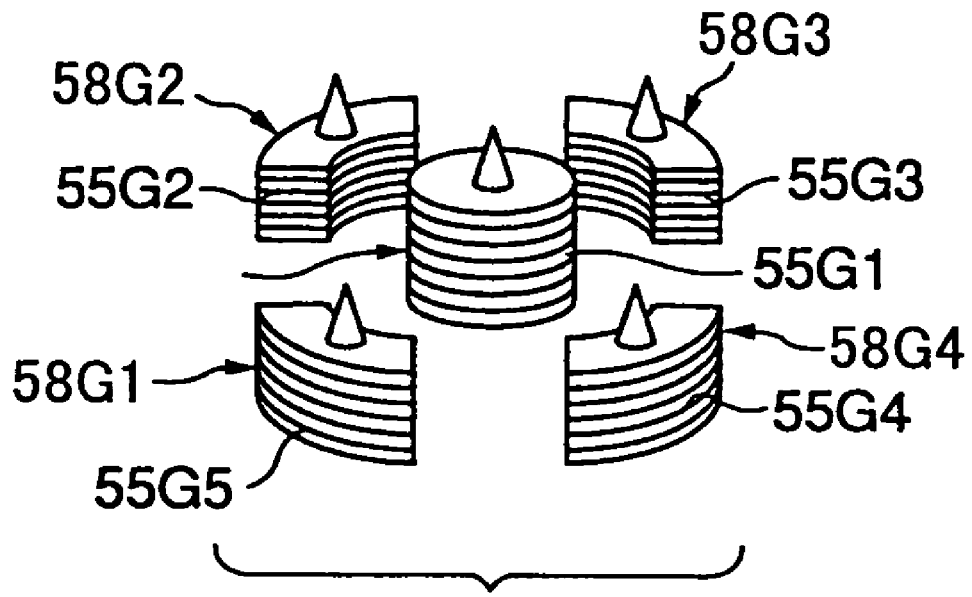
FIG. 15 is a diagram of another embodiment of a tactile-stimulating device.
Figure 15:
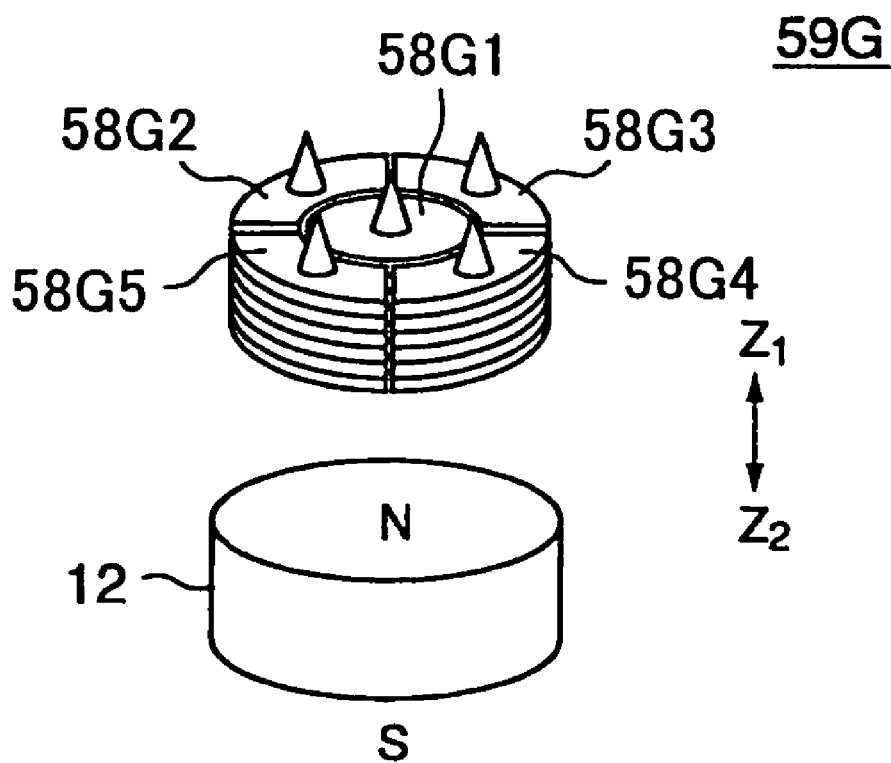

A tactile-stimulating device 59G in FIG. 15, in lieu of, for example, the second tactile-stimulating element 58F2 in the tactile-stimulating device 59F as illustrated in FIG. 14A, includes four tactile-stimulating elements 58G2 through 58G5 which may be the second tactile-stimulating element 58F2 quad-partitioned in the peripheral direction, for example. The tactile-stimulating 59G is configured to have placed on the permanent magnet 12 the tactile-stimulating element 58G1 at the center thereof and the four tactile-stimulating elements 58G2 through 58G5 surrounding the tactile-stimulating element 58G1. The respective tactile-stimulating elements 58G1 through 58G5 individually include corresponding moveable drive coils 55G1 through 55G5.

In accordance with this embodiment, when a pointer on a display screen moves so as to enter a predetermined area, first a driving pulse current is delivered to the moveable drive coil 55G1, and then, the driving pulse current is delivered sequentially to the moveable drive coils 55G2 through 55G5. Hereby, initially the first tactile-stimulating element 58G1 is raised, and then, the second through the fifth tactile-stimulating elements 58G2 through 58G5 are sequentially raised, so that the fingertip is provided with a stimulus over five stages.

As will be appreciated, the keytop (not shown) may have one or a plurality of holes through which the projecting sections of the tactile-stimulating elements 58G1 through 58G5 project. A tactile-stimulating device 59H illustrated in FIGS. 16A and 16B is configured so as to include a tactile-stimulating element 58H enabled to be move in the horizontal direction.

Figure 16A:
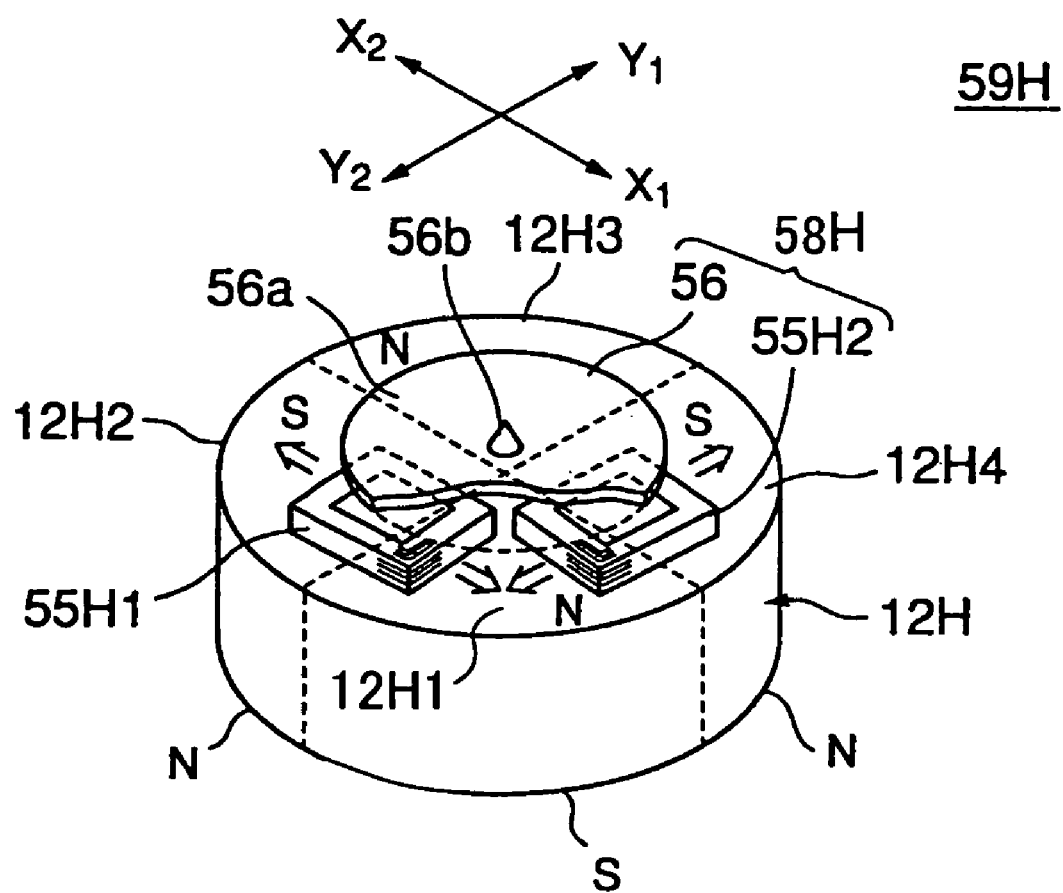
FIG. 16A is a diagram which further illustrates another embodiment of the tactile-stimulating device.

As illustrated in FIG. 16A, a tactile-stimulating device 59H has the tactile-stimulating element 58H and a permanent magnet 12H. The permanent magnet 12H has magnetized in the axial direction respective areas 12H1 through 12H4, quad-divided in the peripheral direction. The neighboring areas in the peripheral direction on the top and bottom faces are different poles. The tactile-stimulating element. 58H includes a projecting member 56, and moveable drive coils 55H1 and 55H2 fixed to the bottom face of the projecting member 56. The moveable drive coil 55H1 is arranged so as to extend over the area 12H1 and the area 12H2 while the moveable drive coil 55H2 is arranged so as to extend over the area 12H4 and the area 12H1. The tactile-stimulating element 58H is placed on the top face of the permanent magnet 12H, being enabled to move along the top face of the permanent magnet 12H. When a drive current is delivered to the moveable drive coil 55H1, the drive current and the magnetic lines of force acting on the side extending in the direction of Y1-Y2 within the moveable drive coil 55H1 produces a driving force at the moveable drive coil 55H1 in the direction of X1 or X2. When a drive current is delivered to the moveable drive coil 55H2, the drive current and the magnetic lines of force acting on the side extending in the direction of X1-X2 within the moveable drive coil 55H2 produces a drive force at the moveable drive coil 55H2 in the direction of Y1 or Y2.

Figure 16B:
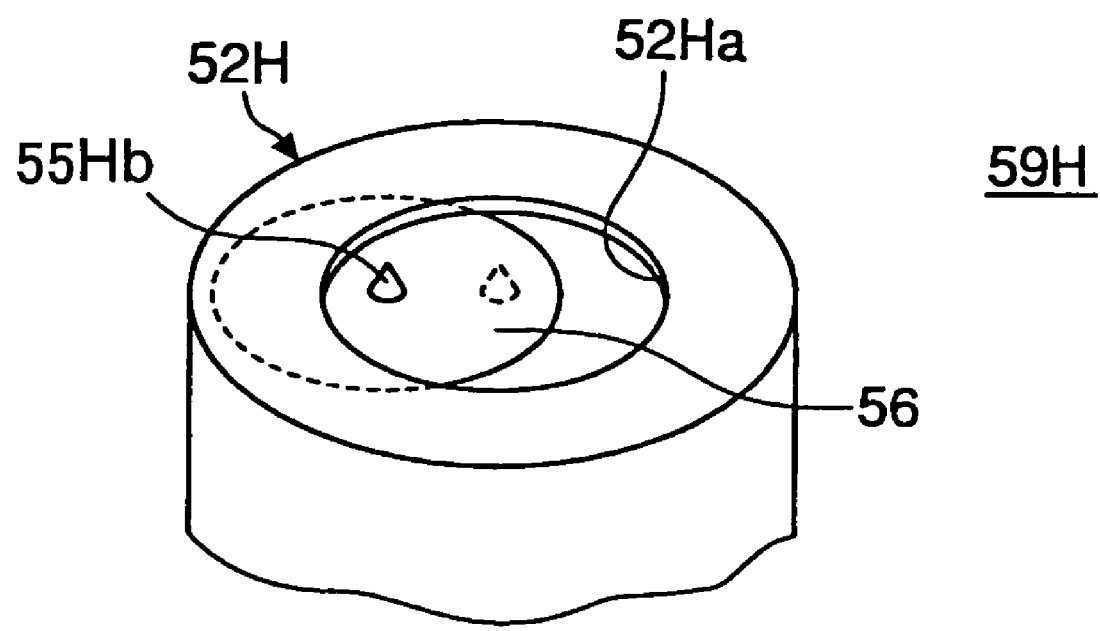
FIG. 16B is another diagram which further illustrates another embodiment of the tactile-stimulating device.

Referring to FIG. 16B, a keytop 52H has formed therein an opening 52Ha, and has a projecting section 55Hb projecting through the center of the large opening 52Ha. In accordance with this embodiment, when the keytop 52H is operated with the fingertip so that a pointer on a display screen is caused to move so as to enter a predetermined area; a drive current is delivered to the moveable drive coil 55H1 and 55H2; the projecting member 56 as illustrated in FIG.

16B moves on the top face of the permanent magnet 12H within the direction of X-Y plane; and the projecting section 55Hb moves within the opening 52Ha to run across the fingertip, so as to provide a stimulus to the tactile sense of the fingertip.

(A Configuration of a Tactile-Stimulating Device Drive Circuit 74)

Next, an exemplary drive current and the like delivered to the moveable drive coil is described.

Figure 17A:
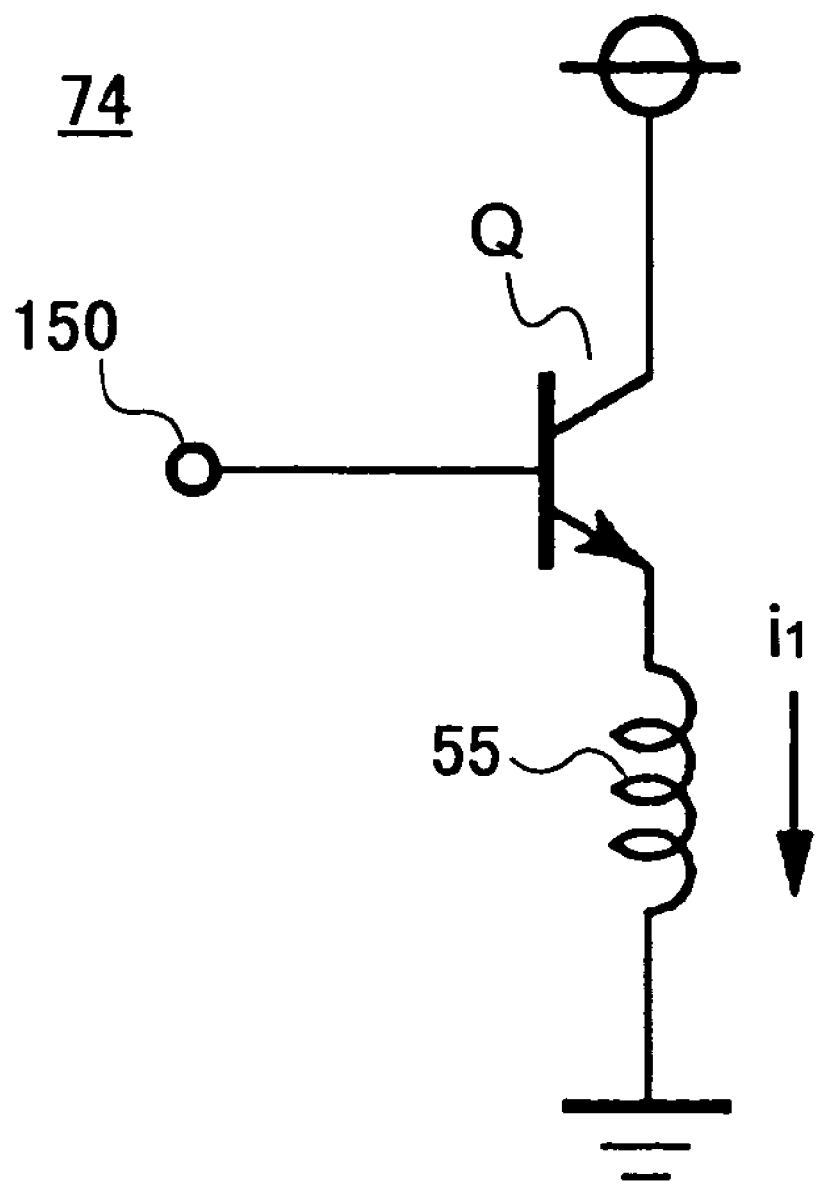
FIG. 17A is a diagram of a tactile-stimulating device drive circuit.
Figure 17B:
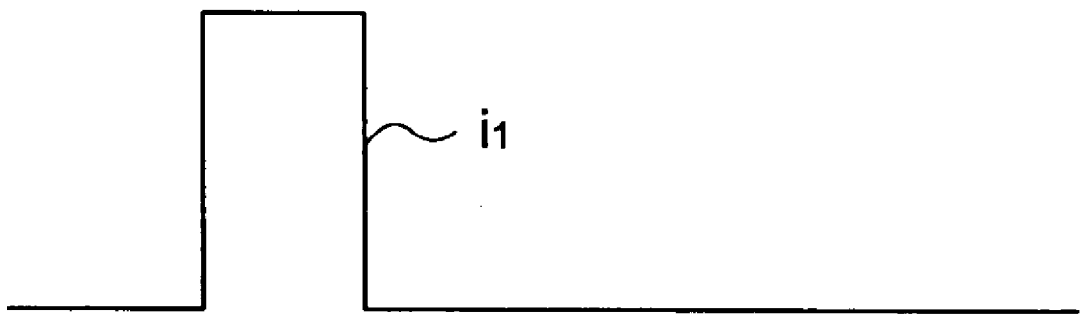
FIG. 17B is a diagram of a waveform of a driving pulse current of the tactile-stimulating device drive circuit.

FIG. 17A illustrates an exemplary configuration of a tactile-stimulating device drive circuit 74 in FIG. 7. An emitter of a transistor Q is connected to a moveable drive coil 55. When a pointer on a display screen is caused to be moved so as to enter a predetermined area so that a signal from the CPU 70 is applied to a terminal 150, a pulse current i1 illustrated in FIG. 17B flows into the moveable drive coil 55.

Figure 17C:
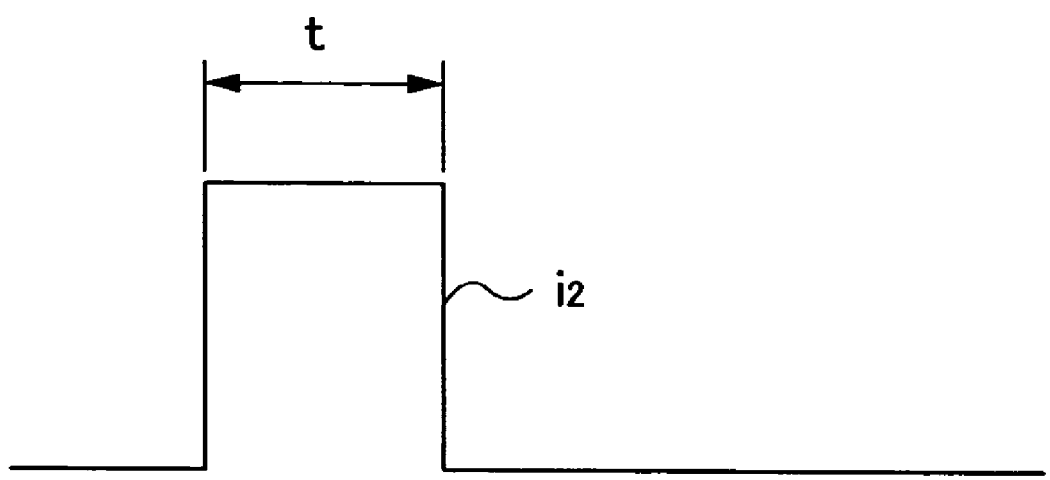
FIG. 17C is a diagram of another waveform of the driving pulse current.
Figure 17D:
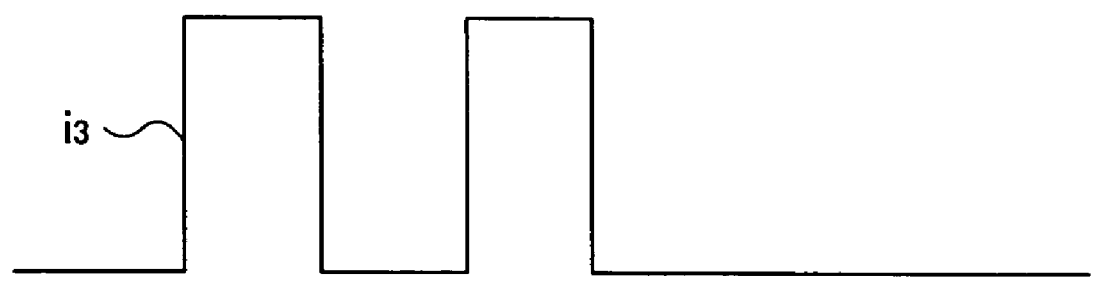
FIG. 17D is a diagram of yet another waveform of the driving pulse current.
Figure 17E:
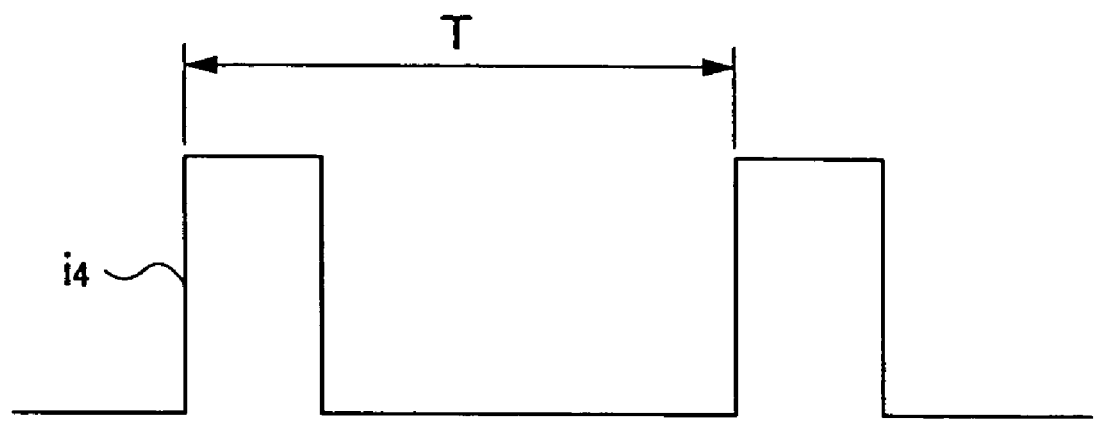
FIG. 17E is a diagram of yet another waveform of the driving pulse current.
Figure 17F:
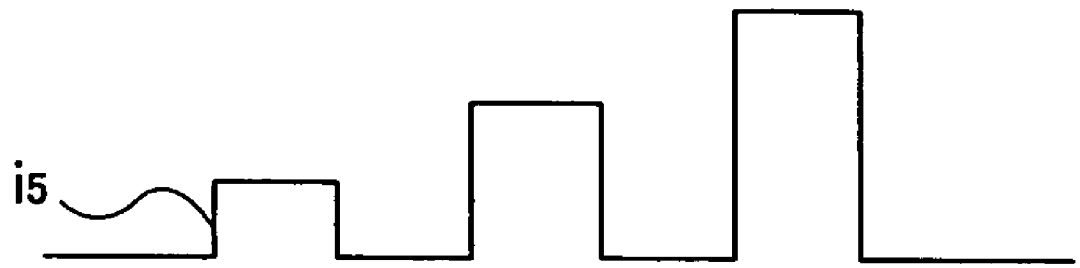
FIG. 17F is a diagram of yet another waveform of the driving pulse current.

A setting of the CPU 70 to generate various signals causes a current i2 with a different pulse width t as illustrated in FIG. 17C, a current i3 with multiple repetitions of pulses as illustrated in FIG. 17D, a current i4 having changed a pulse period T as illustrated in FIG. 17E, and a current i5 having changed pulse levels as illustrated in FIG. 17F to flow.

A tactile-stimulating device, such as the tactile-stimulating device 58 in FIG. 4, operates in response to the pulse currents i1 through i5 as described above so that different stimuli are provided to the tactile sense of the fingertip during operation.

Figure 17G:
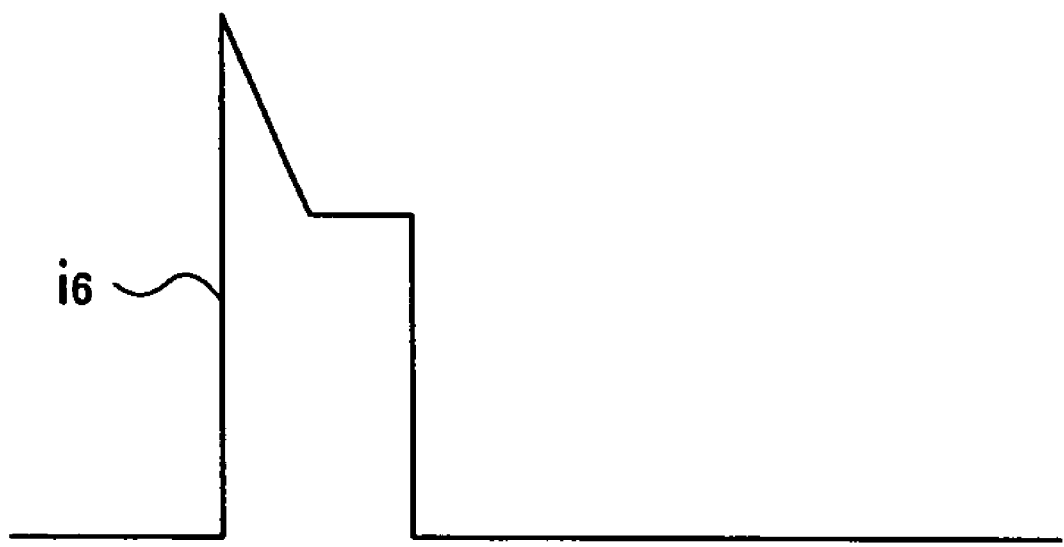
FIG. 17G is a diagram of yet another waveform of the driving pulse current.

Moreover, using a boosting circuit 75 in FIG. 7, as illustrated for example in FIG. 17G, causes a pulse current i6 to raise an initial level of its pulse to flow. In this case, the tactile-stimulating element 58 accelerates at an early stage of driving so as to act speedily.

Figure 18A:
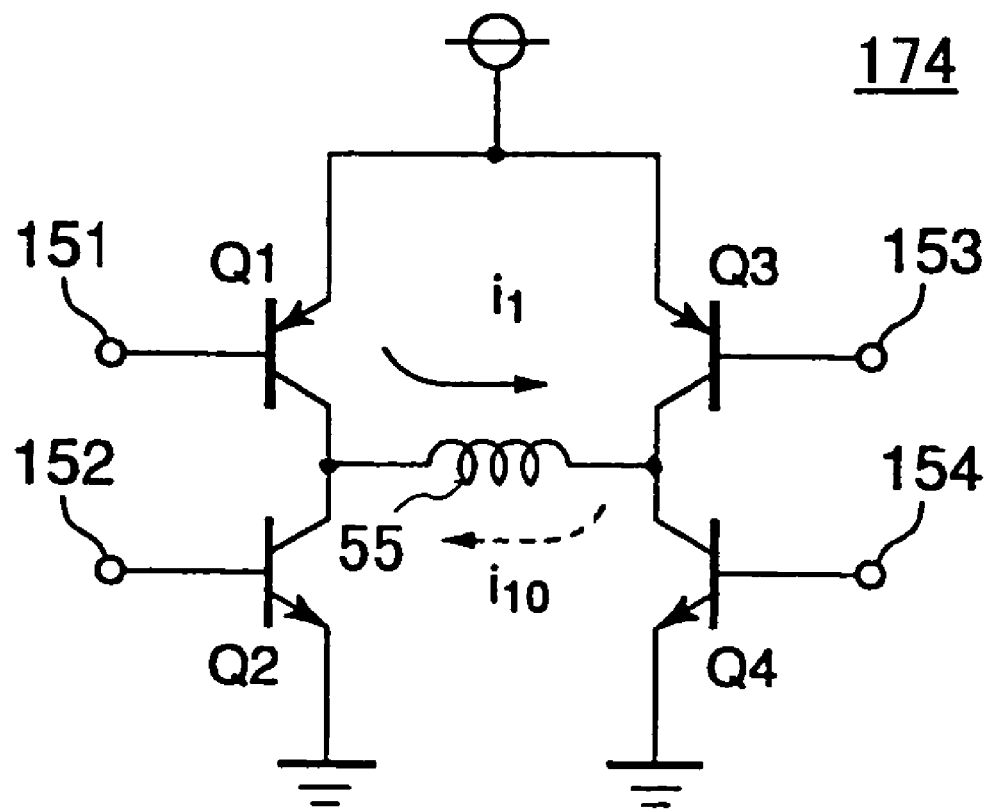
FIG. 18A is a diagram of another embodiment of a tactile-stimulating device drive circuit.
Figure 18B:
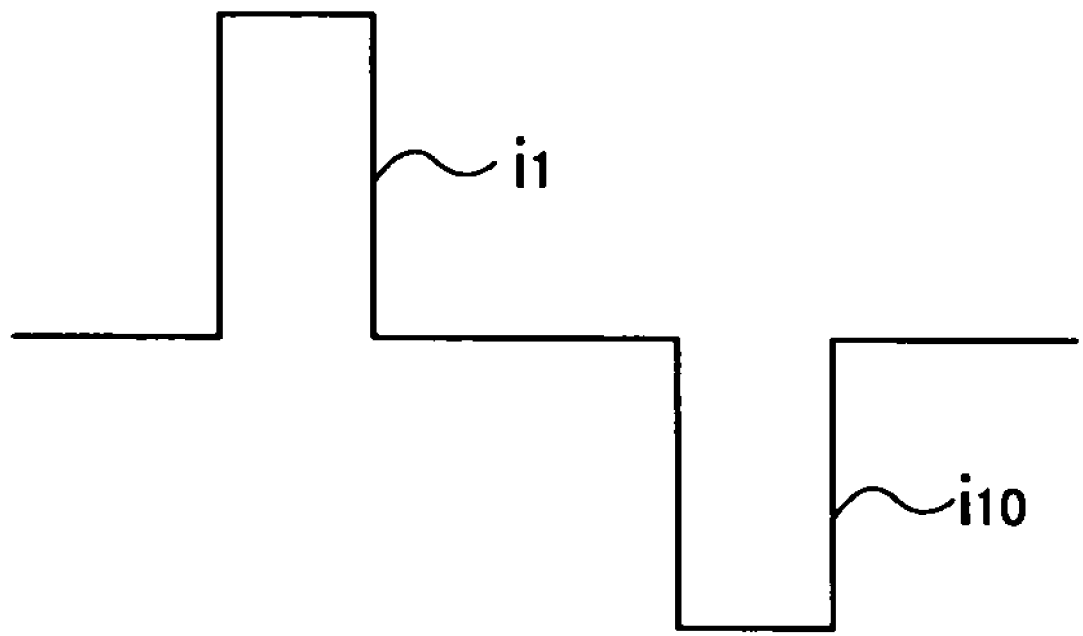
FIG. 18B is a diagram of a waveform of a driving pulse current of the tactile-stimulating device drive circuit.

FIG. 18A illustrates an embodiment of a tactile-stimulating device drive circuit 174 in FIG. 7. Four transistors Q1 through Q4 and the moveable drive coil 55 form an H-bridge. A signal from the CPU 70 is applied to each terminal 151 through 154.

The signal from the CPU 70 is initially applied to terminals 151 and 154, the transistors Q1 and Q4 are turned on, a pulse current i1 flows into the moveable drive coil 55 in the direction as represented by a solid arrow, then, the signal from the CPU 70 is applied to terminals 153 and 152, and the transistors Q3 and Q2 are turned on so that a pulse current i10 flows into the moveable drive coil 55 in the reverse direction as represented by a dotted arrow (referring to FIG. 18A).

The pulse current i1 causes the tactile-stimulating element 58 to be moved in the direction away from the permanent magnet 12 while the pulse current i10 causes the tactile-stimulating element 58 to be moved in a direction to approach the permanent magnet 12. The tactile-stimulating device 59 operates without its function being substantially impacted by the position of the remote control unit 60, even in a position having the front and back faces of the remote control unit 60 reversed.

(The Position of a Pointer 85 and a Timing of a Generating of a Pulse Current)

Figure 19A:
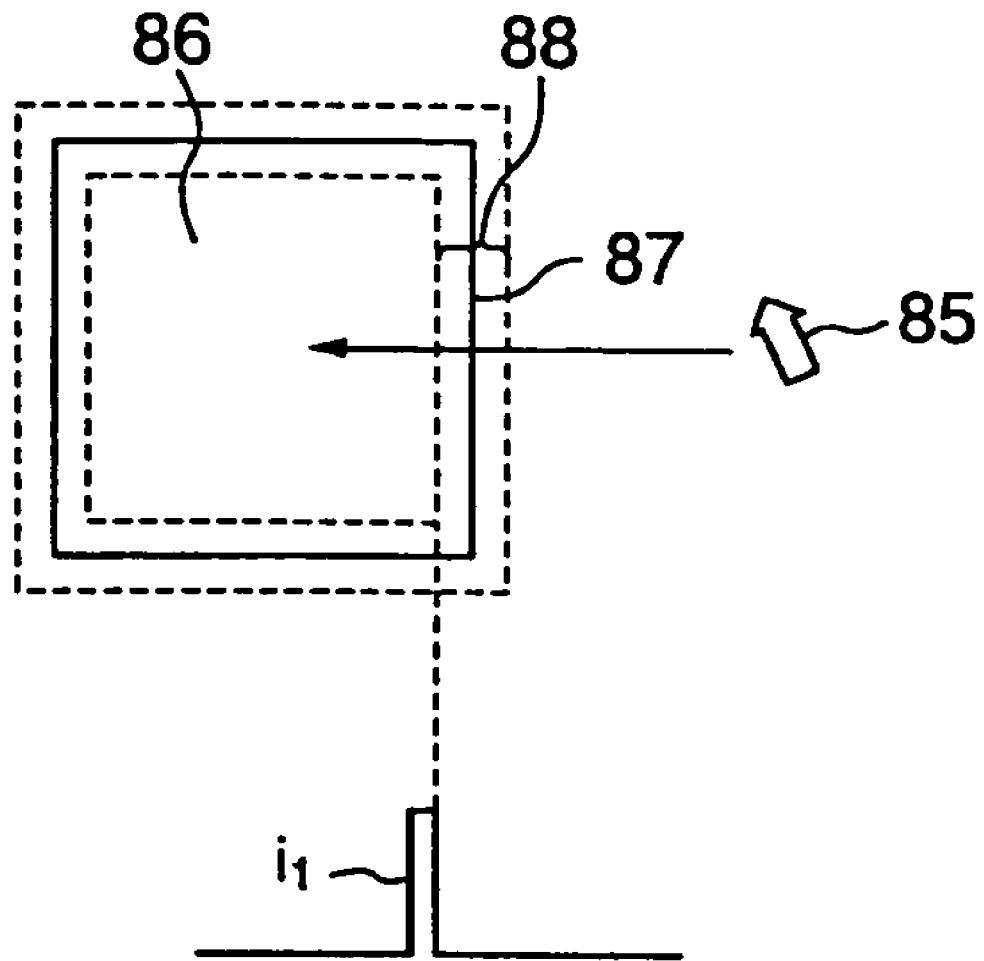
FIG. 19A is a diagram of a pointer position and a timing of a generating of a drive current.
Figure 19B:
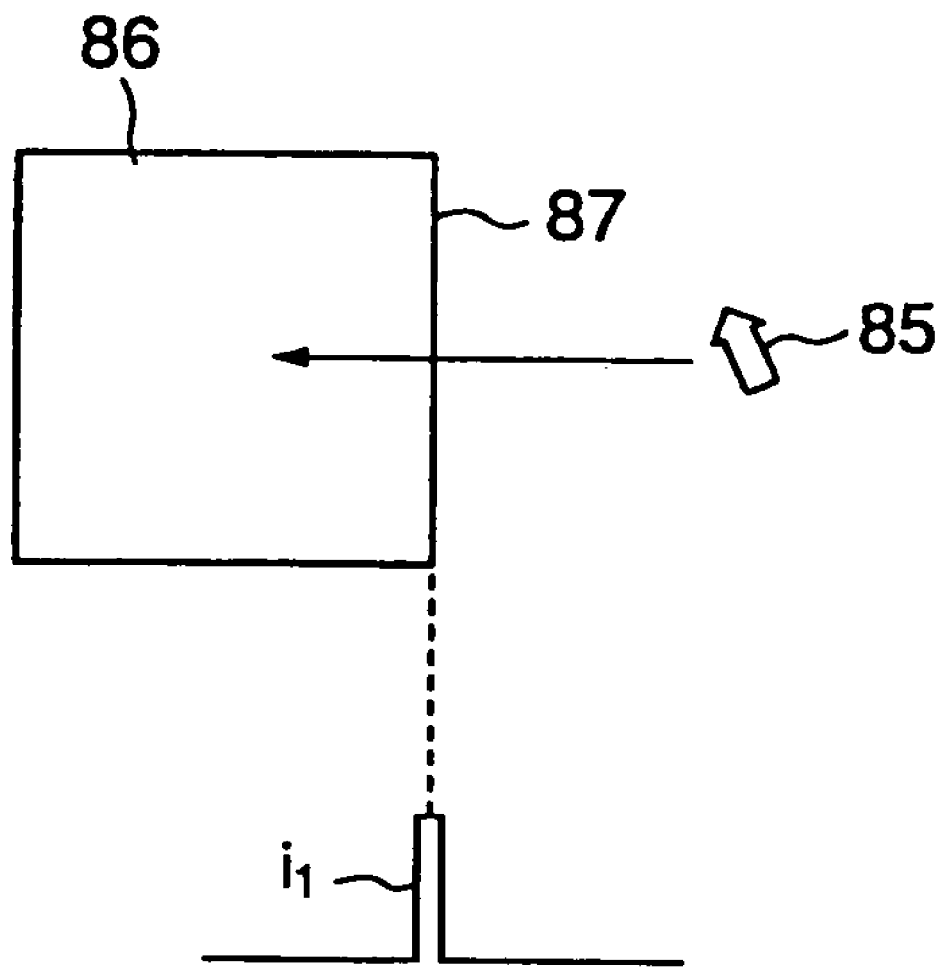
FIG. 19B is another diagram of the pointer position and the timing of the generating of the drive current.

FIG. 19A and FIG. 19B respectively illustrate a position of a pointer 85 on a display screen 80 and a timing of a generating of a pulse current i1.

As illustrated in FIG. 19A, a dead zone 88 is formed at a portion of a boundary 87 of an area 86. When a pointer 85 which has approached the area 86 crosses the boundary 87 and furthermore proceeds beyond the dead zone 88, a pulse current i1 is produced. According to this configuration, in a case where the pointer 85 points the area 86, the tactile sense of a fingertip during operation is stimulated. Even in a case of operating an execute button at the same time the tactile sense is stimulated as described above, a computer executes an operation corresponding to the area 86. Moreover, in a case where the pointer 85 is caused to be moved so as to be inadvertently swung to the left and the right on the boundary 87, the pulse current i1 is not produced so as to provide, advantageously, no stimuli to the tactile sense of the fingertip.

Furthermore, as illustrated in FIG. 19B, a pulse current i1 may be caused to be produced at a time when the pointer 85 which has been caused to approach the area 86 crosses the boundary 87.

(Examples of Using the Remote Control Unit 60 and the Condition of Producing the Pulse Current)

Figure 20A:
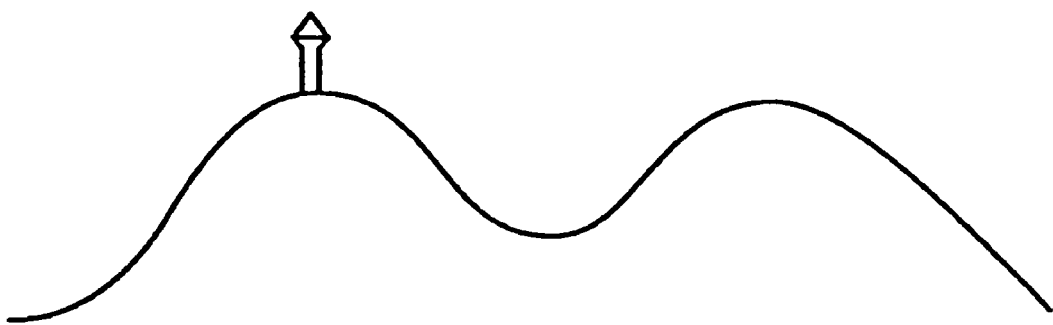
FIG. 20A is a diagram of an example of using the remote control unit in FIG. 6.
Figure 20B:
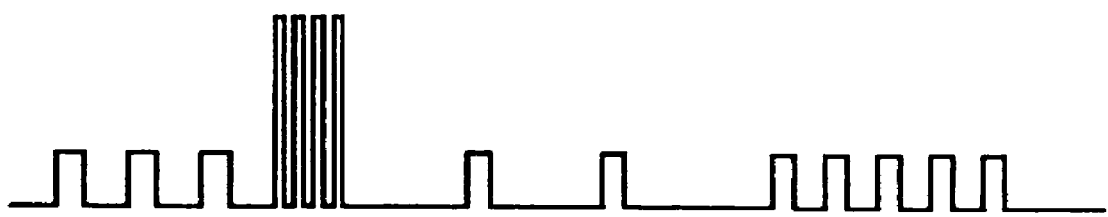
FIG. 20B is a diagram of another example of using the remote control unit in FIG. 6.
Figure 20C:
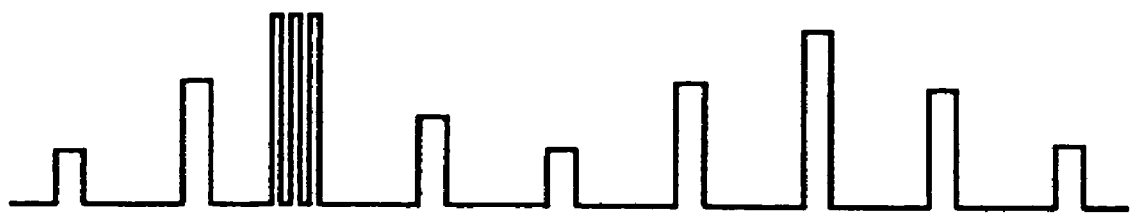
FIG. 20C is a diagram of yet another example of using the remote control unit in FIG. 6.

FIG. 20A through FIG. 20C respectively illustrate an operation of a tactile-stimulating device 59 in a case of operating a console game and the like using, for example, the remote control unit 60.

FIG. 20A illustrates a display screen. FIG. 20B illustrates a relationship between a location within the display screen pointed by a pointer and a pulse current generated at that time. The pulse period becomes longer, for example, when the pointer points to a trough and becomes shorter, for example, when the pointer points to a crest. In addition, the pulse level becomes higher and also the pulse period becomes even shorter, for example, when the pointer points to, for example, a lighthouse at the peak. Controlling of the pulse may be performed at, for example, the CPU 70 in FIG. 7.

As illustrated in FIG. 20C, the pulse level may be changed without changing the pulse period. The pulse level becomes higher as the pointer moves from the trough to the crest.

Moreover, both the pulse period and the pulse level may be changed so as to cause the pulse level to be high while causing the pulse period to be short as the pointer moves from the trough to the crest.

(Embodiments of a Drive Method of a Tactile-stimulating Device)

Figure 21:
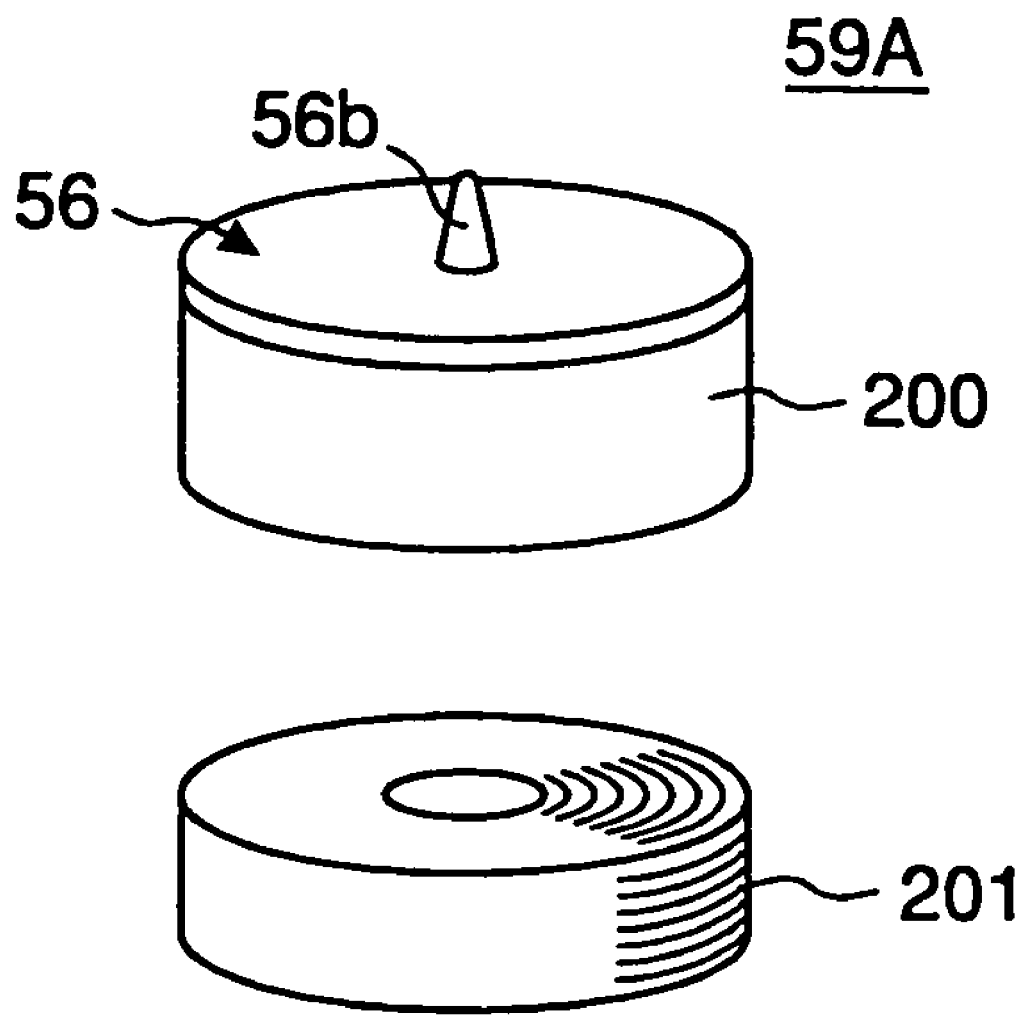
FIG. 21 is a diagram of a tactile-stimulating device using a first drive method.

A tactile-stimulating device 59A in FIG. 21 includes a magnetostrictive element 200, a coil 201, and a projecting member 56. When a current is delivered to the coil 201, the magnetostrictive element 200 is caused to be deformed so that the projecting member 56 is caused to be moved.

Figure 22A:
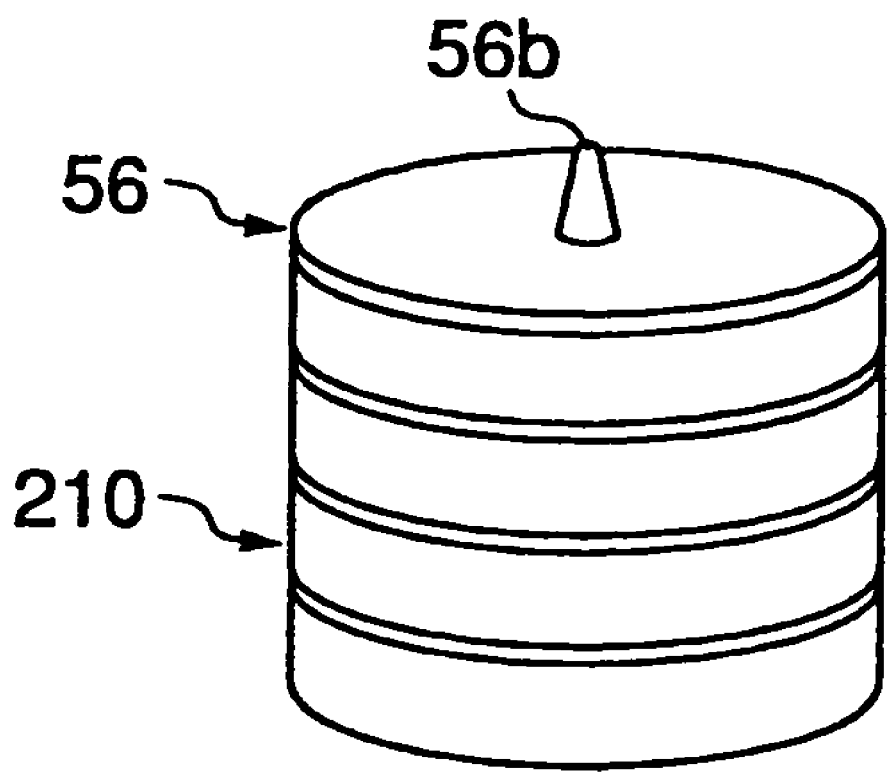
FIG. 22A is a diagram of a tactile-stimulating device using a second drive method.
Figure 22B:
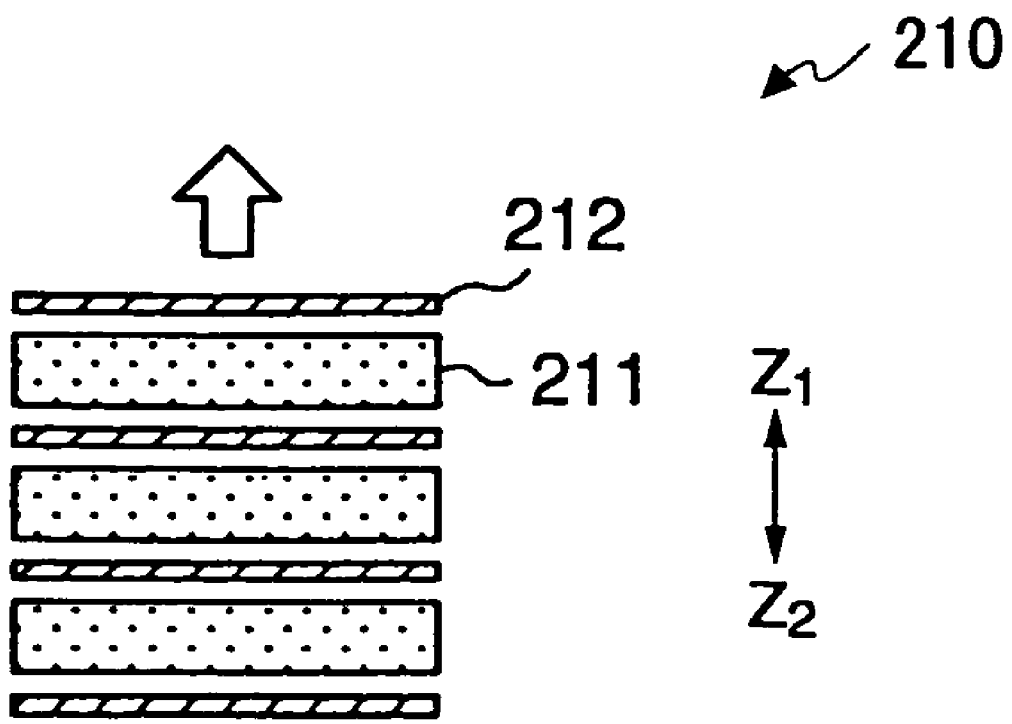
FIG. 22B is another diagram of the tactile-stimulating device using the second drive method.

A tactile-stimulating device 59B shown in FIG. 22A includes an electrostatic actuator 210 having layered a dielectric 211 and a conducting material 212 (referring to FIG. 22B), and a projecting member 56. When a voltage is applied to the electrostatic actuator 210, the electrostatic actuator 210 is caused to be deformed so as to cause the projecting member 56 to be moved.

Figure 23:
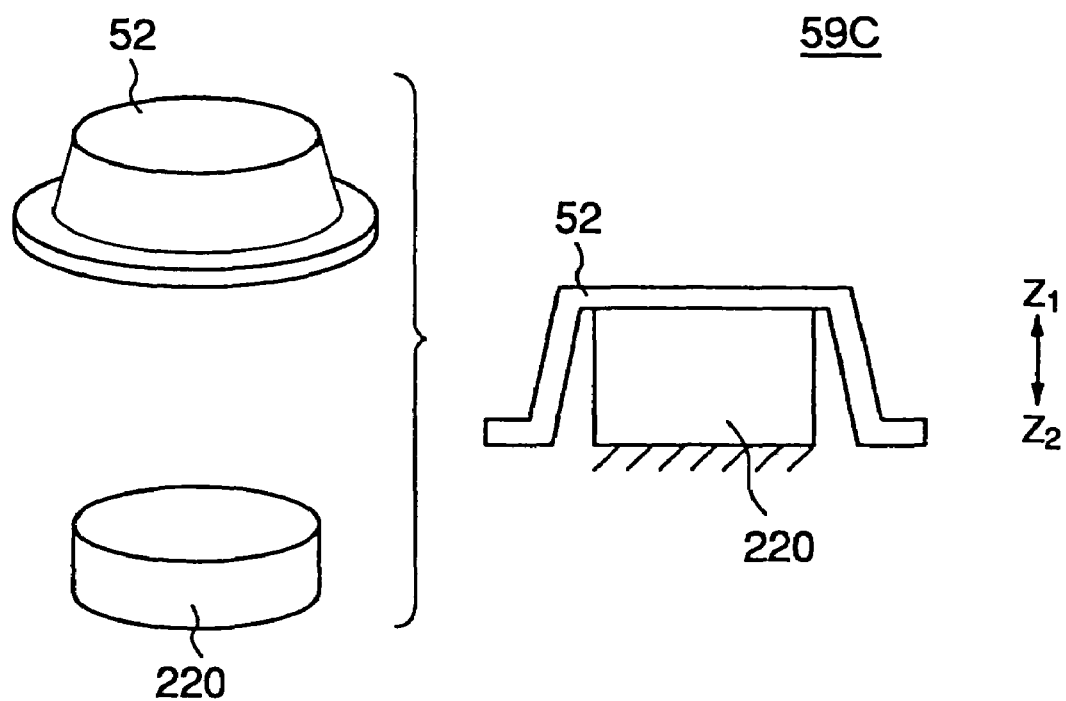
FIG. 23 is a diagram of a tactile-stimulating device using a third drive method.

A tactile-stimulating device 59C shown in FIG. 23 is configured to include a piezoelectric actuator 220 causing the keytop 52 itself to be to moved up and down.

Figure 24A:
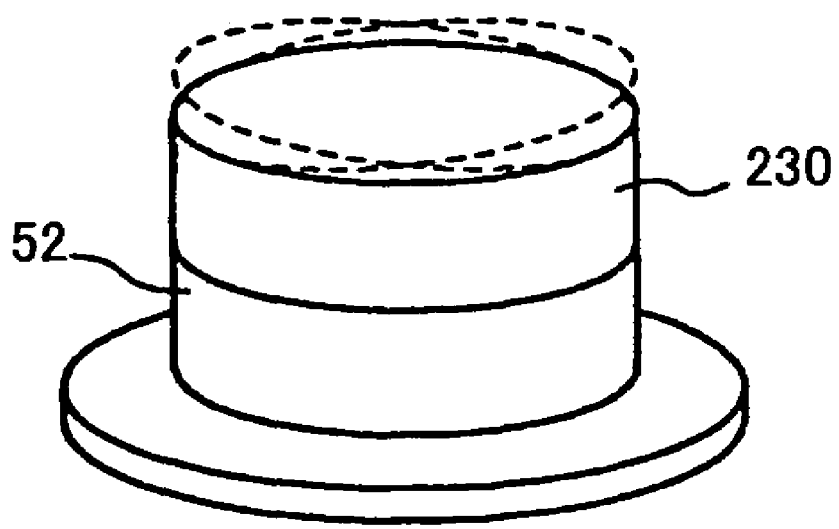
FIG. 24A is a diagram of a tactile-stimulating device using a fourth drive method.
Figure 24B:
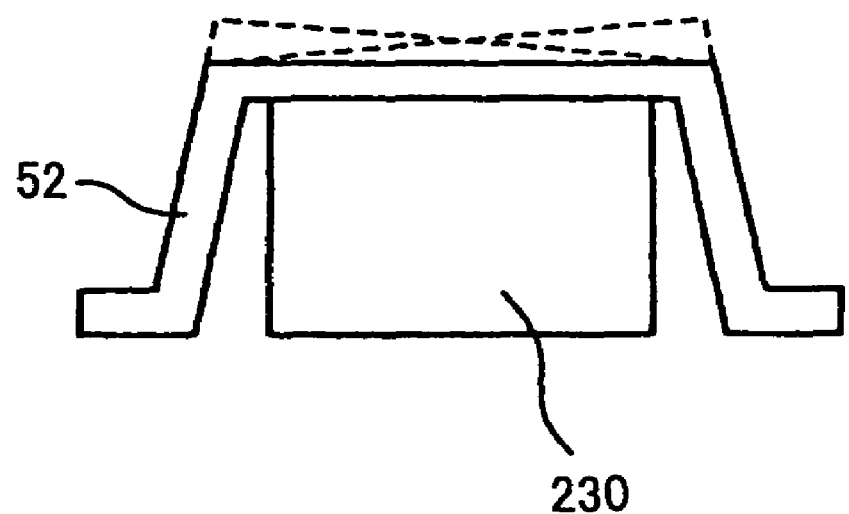
FIG. 24B is another diagram of the tactile-stimulating device using the fourth drive method.

Tactile-stimulating devices 59C-1 and 59C-2 shown in FIG. 24A and FIG. 24B respectively are configured to include a vibrating motor 230 causing the keytop 52 to be vibrated. The tactile-stimulating device 59C-1 is configured to provide the vibrating motor 230 on the top face of the keytop 52 while the tactile-stimulating device 59C-2 is configured to provide the vibrating motor 230 within the keytop 52.

Figure 25A:
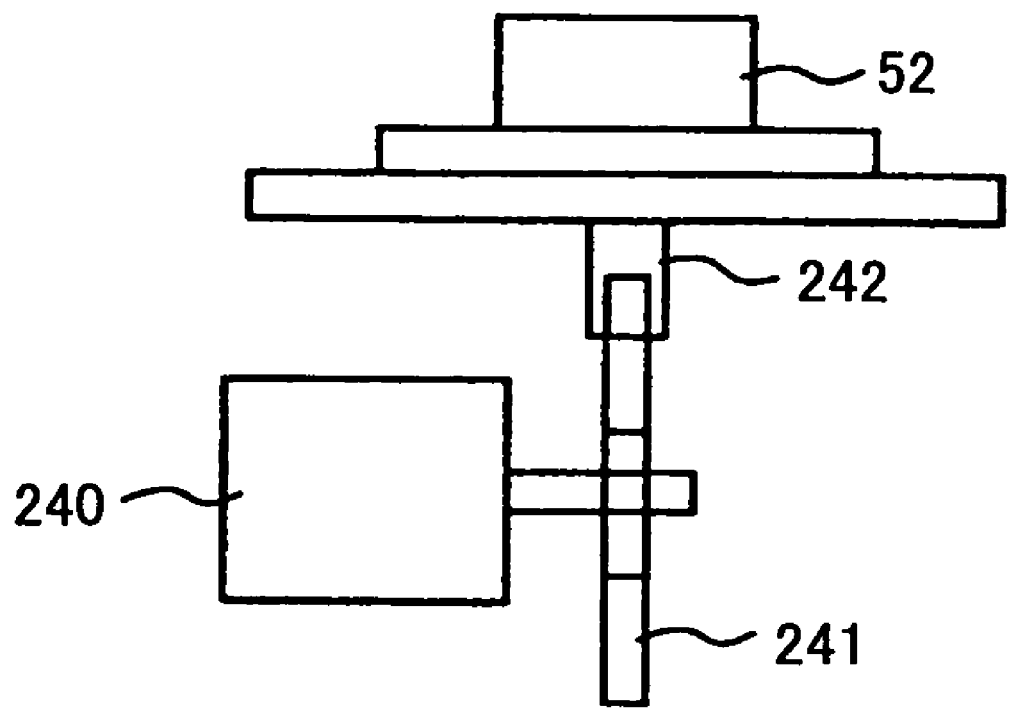
FIG. 25A is a diagram of a tactile-stimulating device using a fifth drive method.
Figure 25B:
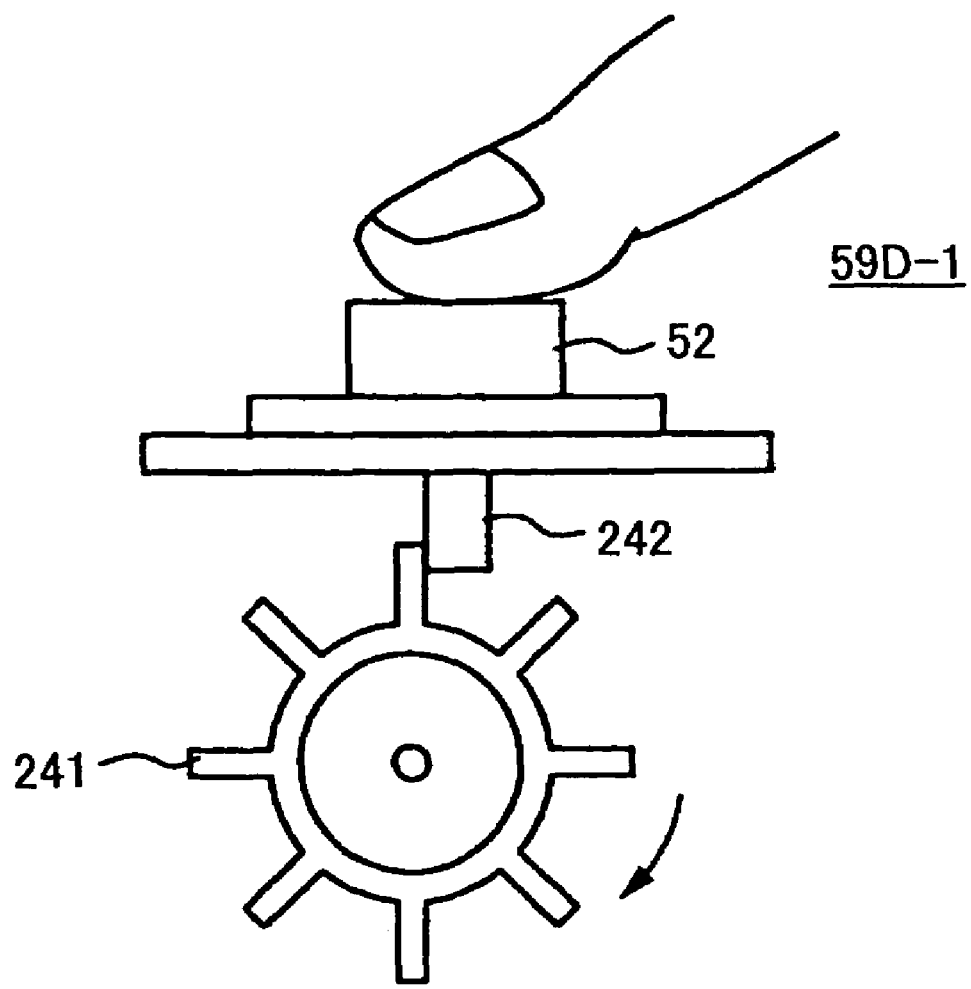
FIG. 25B is another diagram of the tactile-stimulating device using the fifth drive method.

A tactile-stimulating device 59D-1 shown in FIG. 25A and FIG. 25B is configured to have a motor (not shown) causing an impeller 241 to rotate and the impeller 241, in turn, to kick and repel a fin 242, thereby causing the keytop 52 to be vibrated.

Figure 26:
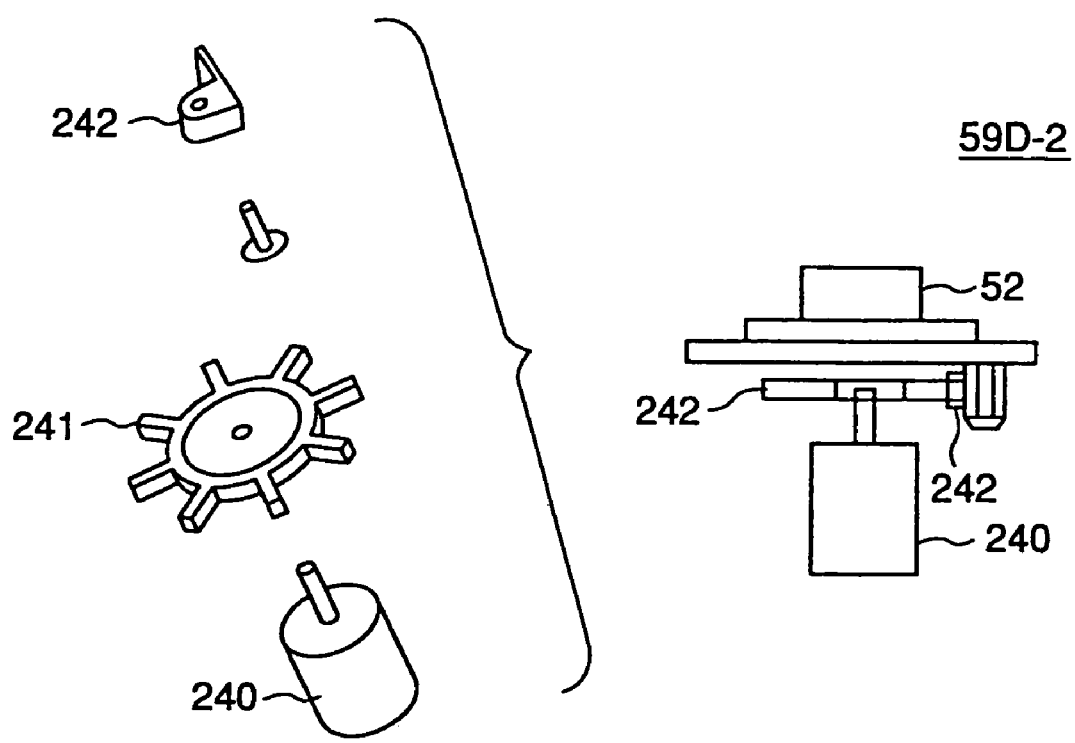
FIG. 26 is a diagram illustrating an embodiment of the tactile-stimulating device illustrated in FIG. 25.

A tactile-stimulating device 59D-2 shown in FIG. 26 is somewhat similar to the tactile-stimulating device 59D-1 in the embodiment of FIG. 25A and FIG. 25B, but is arranged to have an impeller 241 rotating within the horizontal plane.

(Example of an Operating Device and the Like into Which an Inputting Device 50 May be Incorporated)

Figure 27A:
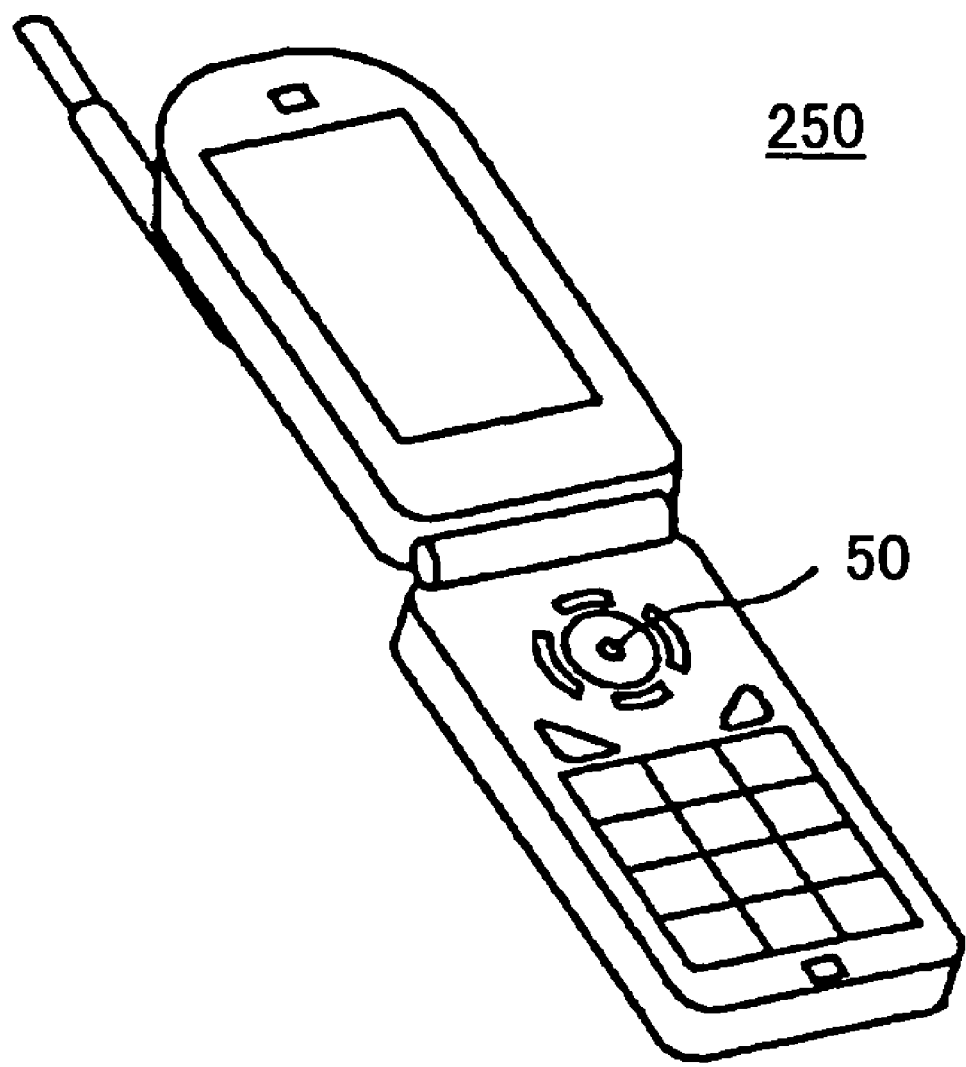
FIG. 27A is a diagram of an apparatus incorporating the inputting device illustrated in FIG. 2.
Figure 27B:
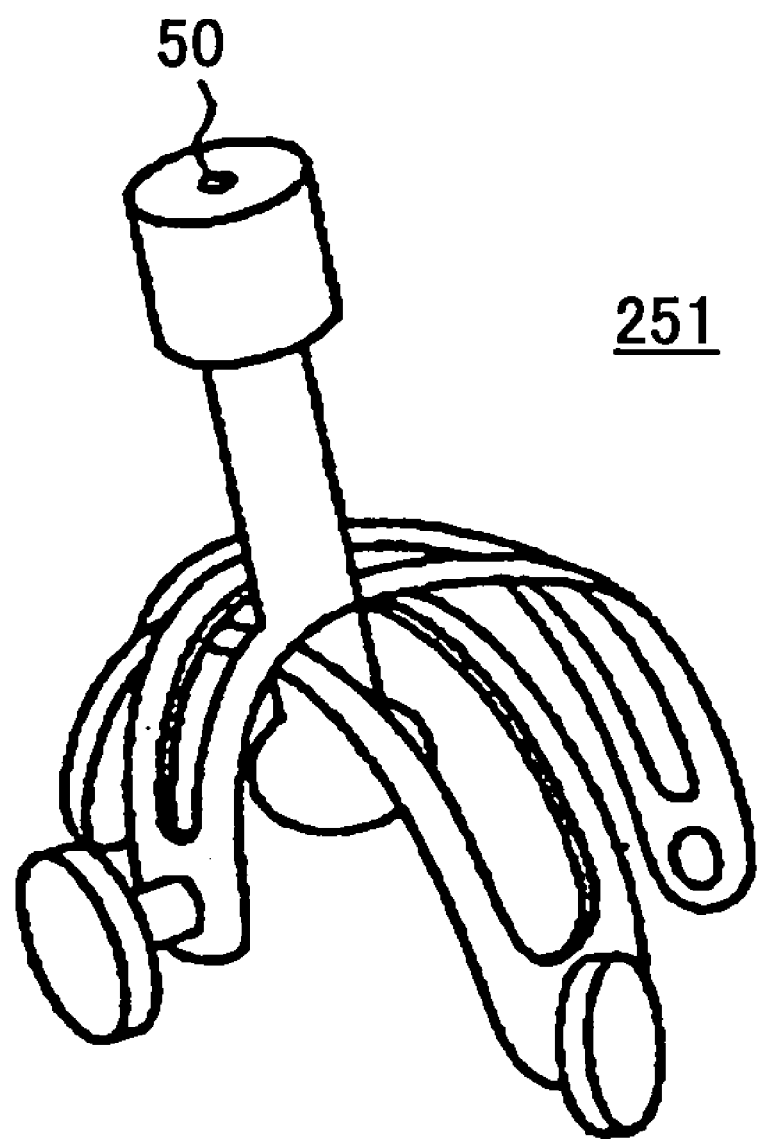
FIG. 27B is a diagram of another apparatus incorporating the inputting device illustrated in FIG. 2.
Figure 27C:
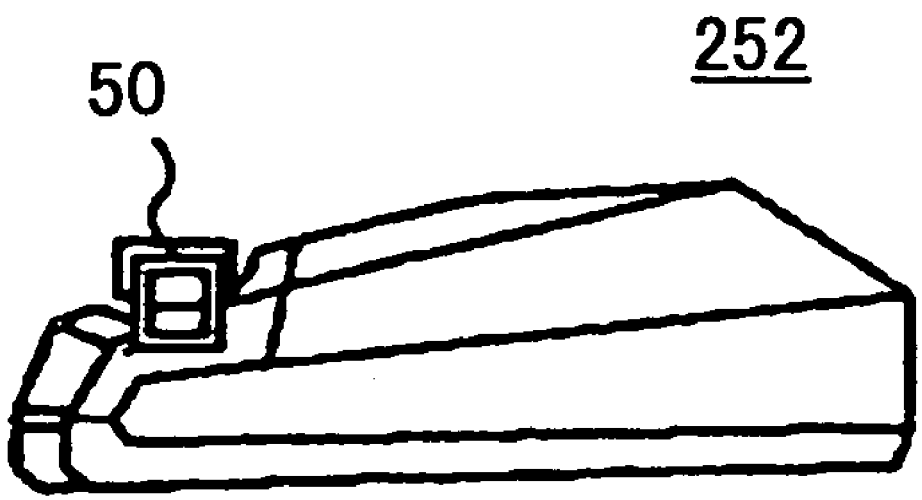
FIG. 27C is a diagram of yet another apparatus incorporating the inputting device illustrated in FIG. 2.
Figure 27D:
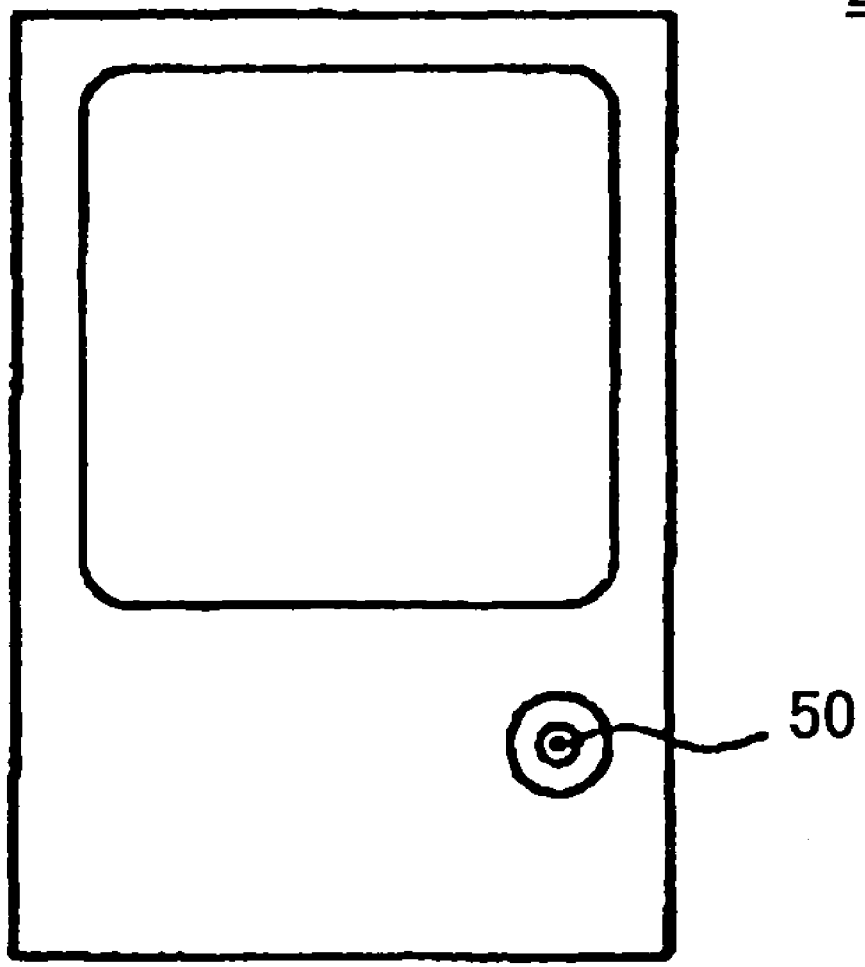
FIG. 27D is a diagram of yet another apparatus incorporating the inputting device illustrated in FIG. 2.
Figure 27E:
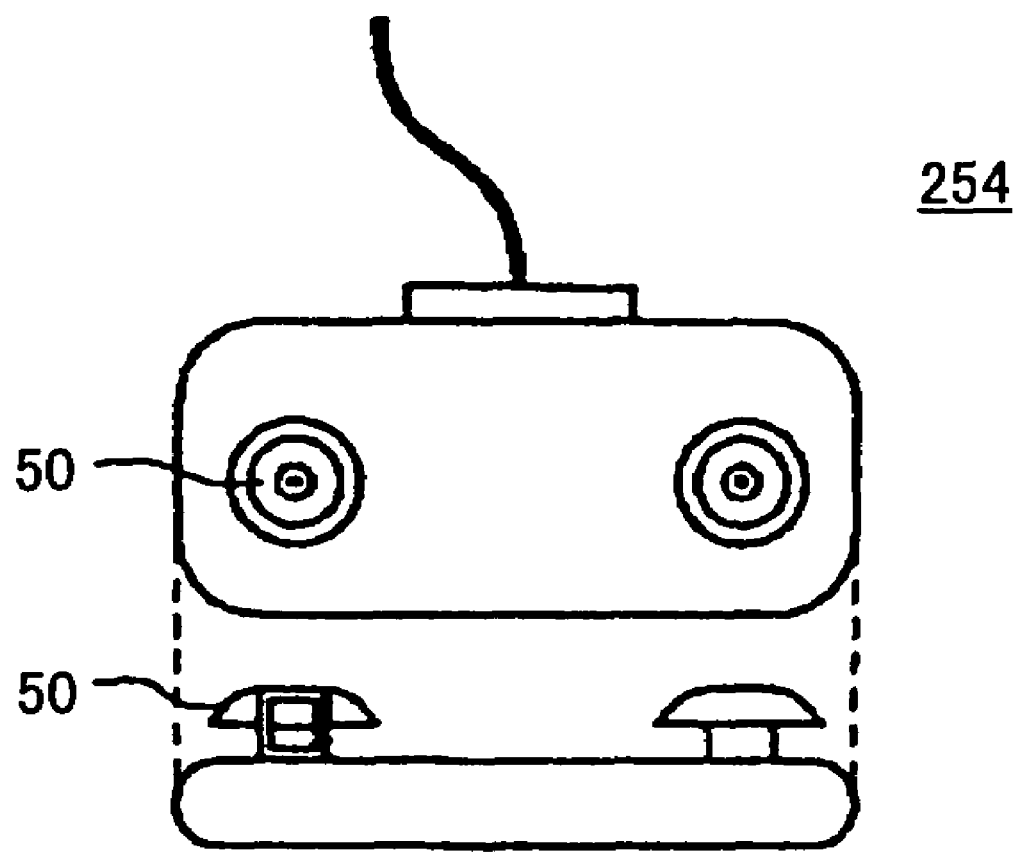
FIG. 27E is a diagram of yet another apparatus incorporating the inputting device illustrated in FIG. 2.

The inputting device 50 may be incorporated into a portion of a portable telephone 250 operated by a finger as illustrated in FIG. 27A, a joystick device 251 as illustrated in FIG. 27B, a mouse 252 as illustrated in FIG. 27C, a PDA 253 as illustrated in FIG. 27D, and/or a game paddle 254 as illustrated in FIG. 27E.

Figure 28:
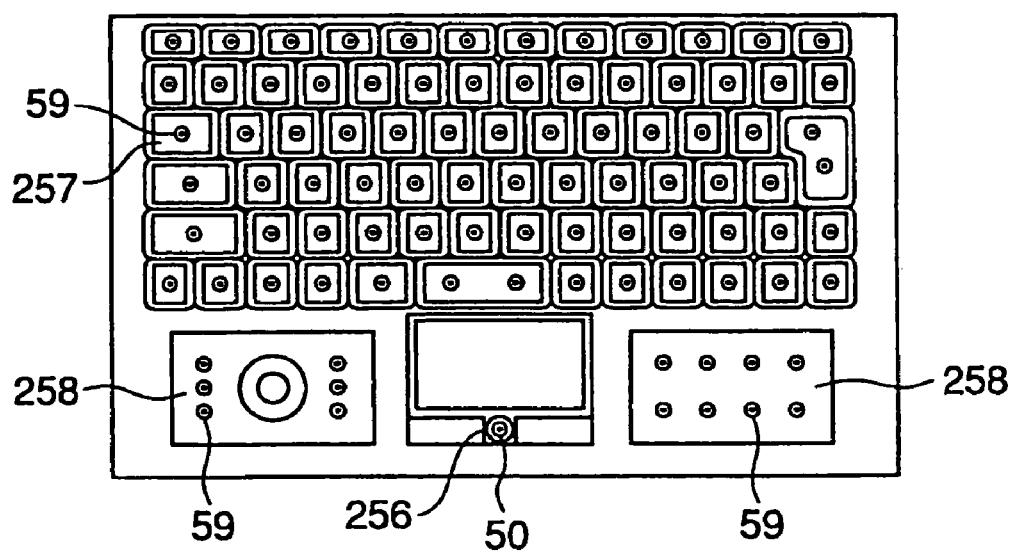
FIG. 28 is a diagram illustrating a keyboard incorporating the inputting device illustrated in FIG. 2.

FIG. 28 illustrates a keyboard 255. The inputting device 50 as described above is incorporated into a dome point 256.

(Other Example of Using the Tactile-Stimulating Device 59)

As illustrated in FIG. 28, arranging a tactile-stimulating device 59 to be lined up at portions of respective keys 257 and a keyboard 255 on which a palm 258 may be placed, so as to properly cause a driving of the tactile-stimulating device 59, whereby a stimulus is provided to a fingertip and/or a palm so as to obtain a massaging or stimulating effect.

Figure 29A:
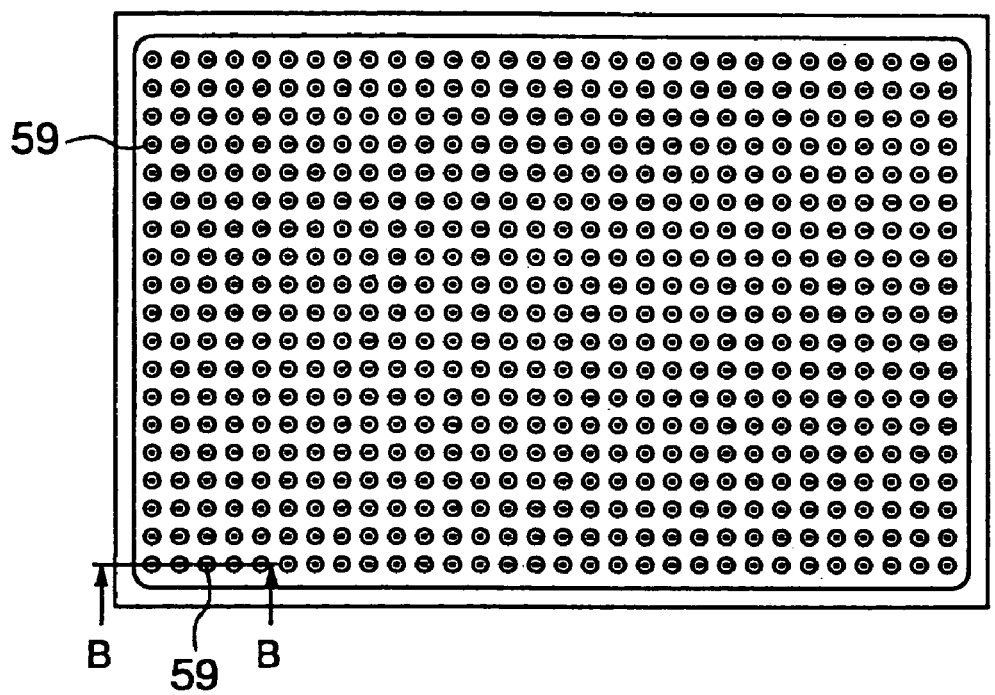
FIG. 29A is a diagram of a tactile-display device.
Figure 29B:
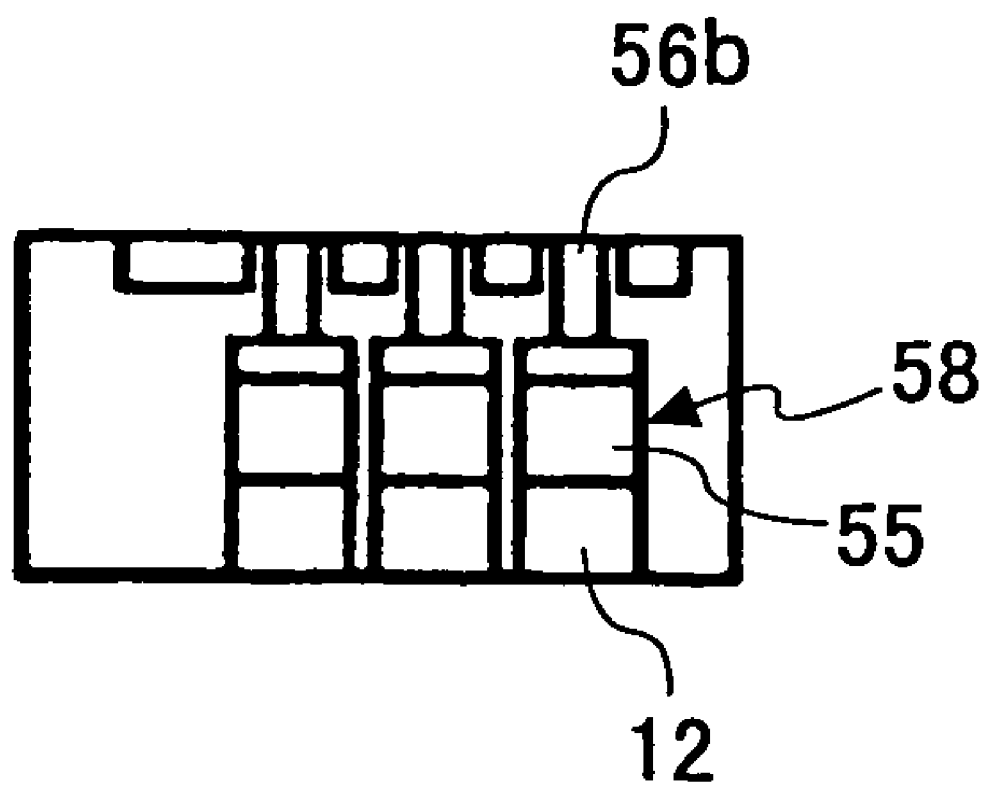
FIG. 29B is another diagram of the tactile-display device.

FIG. 29A and FIG. 29B illustrate a tactile-display device 260 having arranged the tactile-stimulating device 59 to be lined up in a matrix pattern. While having a palm placed on the tactile-display device 260, a causing of a driving of the tactile-stimulating device 59 at the position corresponding to a certain pattern, for example, enables, with a touch of the palm, a recognizing of the certain pattern as described above.

The present application is based on Japanese Priority Application No. 2003-165357 filed Jun. 10, 2003, with the Japanese Patent Office, the entire contents of which are hereby incorporated by reference.

What is claimed is:

1. An inputting apparatus for use with a pointer on a display screen, comprising:
   a tilt-enabled manipulating section comprising a keytop having an opening therein upon which a finger may be placed to manipulate the inputting apparatus and a tubular-shaped holder held to a lower side of said keytop, said manipulating section including a tactile-stimulating device configured to tactile-stimulate said finger when said pointer is in a predetermined position on the display screen;
   a signal-producing section configured to produce a signal in response to a tilt of the manipulating section, which signal causes the pointer on the display screen to be moved, said signal-producing section further comprising:
      a permanent magnet disposed at a bottom portion of said manipulating section for tilting movement therewith, and
      magneto-electric converting elements which detect a change in a magnetic field corresponding to tilting movement of said permanent magnet, wherein the signal produced by said signal-producing section is based on said change in the magnetic field; wherein:
         said tactile-stimulating device includes a tactile-stimulating element disposed for movement within said holder between a tactile-stimulating position and a non tactile-stimulating position, and wherein said tactile-stimulating element includes a coil and a projecting member positioned with respect to an upper side of said coil, a portion of said projecting member projecting from said opening when the tactile-stimulating element is in the tactile-stimulating position; and
         delivery of a first drive current to said coil generates a first electromagnetic force, using the magnetic field formed by said permanent magnet, which electromagnetic force moves said tactile-stimulating element away from the permanent magnet.

2. The inputting apparatus as claimed in claim 1, wherein said tactile-stimulating device includes:
   a tactile-stimulating element moveable between a tactile-stimulating position and a non tactile-stimulating position,
   the tactile-stimulating element being positioned with respect to the permanent magnet such that an electromagnetic force is generated using the magnetic field formed by said permanent magnet, which electromagnetic force moves said tactile-stimulating element to the tactile-stimulating position.

3. The inputting apparatus as claimed in claim 1, wherein delivery of a second drive current in a direction reverse to said first drive current generates a second electromagnetic force directed towards said permanent magnet, which electromagnetic force moves said tactile-stimulating element towards the permanent magnet.

4. The inputting apparatus as claimed in claim 1, wherein said tactile-stimulating element is a keytop itself.

5. A manipulating apparatus which incorporates thereinto the inputting apparatus as claimed in claim 1.

6. A manipulating apparatus which incorporates thereinto the inputting apparatus as claimed in claim 1.

7. A manipulating apparatus which incorporates thereinto the inputting apparatus as claimed in claim 1.

8. A manipulating apparatus which incorporates thereinto the inputting apparatus as claimed in claim 1.

9. An inputting apparatus for use with a pointer on a display screen, comprising:
   a tilt-enabled manipulating section comprising a keytop having an opening therein upon which a finger may be placed to manipulate the inputting apparatus and a tubular-shaped holder held to a lower side of said keytop, said manipulating section including a tactile-stimulating device configured to tactile-stimulate said finger when said pointer is in a predetermined position on the display screen;
   a signal-producing section configured to produce a signal in response to a tilt of the manipulating section, which signal causes the pointer on the display screen to be moved, said signal-producing section further comprising:
      a permanent magnet disposed at a bottom portion of said manipulating section
   for tilting movement therewith, and
   magneto-electric converting elements which detect a change in a magnetic field corresponding to tilting movement of said permanent magnet, wherein the signal produced by said signal-producing section is based on said change in the magnetic field; wherein:
      said tactile-stimulating device includes a tactile-stimulating element for movement within said holder with respect to a top face of said permanent magnet, which tactile-stimulating element includes a coil and a projecting member positioned with respect to an upper side of said coil, a portion of said projecting member projecting from said opening when the tactile-stimulating element is along the top face of said permanent magnet; and delivery of a first drive current to said coil generates a first electromagnetic force using the magnetic field formed by said permanent magnet, which electromagnetic force moves said tactile-stimulating element to said top face of said permanent magnet.

10. A manipulating apparatus which incorporates thereinto the inputting apparatus as claimed in claim 9.

11. A manipulating apparatus which incorporates thereinto the inputting apparatus as claimed in claim 4.

* * * * *

UNITED STATES PATENT AND TRADEMARK OFFICE
CERTIFICATE OF CORRECTION

PATENT NO.       : 7,310,081 B2
APPLICATION NO.  : 10/815666
DATED            : December 18, 2007
INVENTOR(S)      : Akio Nakamura et al.

It is certified that error appears in the above-identified patent and that said Letters Patent is hereby corrected as shown below:

Column 13, Line 61, change "field:" to --field;--.

Signed and Sealed this

Twenty-fourth Day of November, 2009

David J. Kappos
*Director of the United States Patent and Trademark Office*